(12) United States Patent
Davis et al.

(10) Patent No.: US 11,625,654 B1
(45) Date of Patent: Apr. 11, 2023

(54) SOCIAL NETWORKING MEETUP SYSTEM AND METHOD

(71) Applicants: Raaquan Davis, Dallas, TX (US); Baylor Black, Rockwall, TX (US)

(72) Inventors: Raaquan Davis, Dallas, TX (US); Baylor Black, Rockwall, TX (US)

(73) Assignee: Ventures BRK, Rockwall, TX (US)

( * ) Notice: Subject to any disclaimer, the term of this patent is extended or adjusted under 35 U.S.C. 154(b) by 0 days.

(21) Appl. No.: 17/845,448

(22) Filed: Jun. 21, 2022

Related U.S. Application Data

(60) Provisional application No. 63/305,517, filed on Feb. 1, 2022.

(51) Int. Cl.
  *G06Q 10/00* (2012.01)
  *G06Q 10/0631* (2023.01)
  *G06Q 50/00* (2012.01)

(52) U.S. Cl.
  CPC ....... *G06Q 10/06311* (2013.01); *G06Q 50/01* (2013.01)

(58) Field of Classification Search
  None
  See application file for complete search history.

(56) References Cited

U.S. PATENT DOCUMENTS

| | | | | |
|---|---|---|---|---|
| 8,209,310 B1 * | 6/2012 | Metcalfe | ............ | G06Q 30/0207 709/204 |
| 9,953,091 B1 * | 4/2018 | Gueye | ................ | G06Q 30/0269 |
| 2006/0242154 A1 * | 10/2006 | Rawat | ................... | G06F 16/168 |
| 2008/0140650 A1 * | 6/2008 | Stackpole | ............... | H04W 4/02 707/999.005 |
| 2012/0233557 A1 * | 9/2012 | Wakhlu | ................ | G06F 3/0481 709/204 |
| 2012/0290950 A1 * | 11/2012 | Rapaport | .............. | H04L 67/306 715/753 |
| 2013/0060592 A1 * | 3/2013 | Motoyama | ......... | G06Q 10/1095 705/7.19 |

(Continued)

OTHER PUBLICATIONS

Julia M. Mayer (Supporting Opportunities for Context-Aware Social Matching: An Experience Sampling Study, 2016 ACM). (Year: 2016).*

*Primary Examiner* — Hafiz A Kassim
(74) *Attorney, Agent, or Firm* — John Rizvi; John Rizvi, P.A.—The Patent Professor®

(57) ABSTRACT

A social networking meetup services system and method that facilitate proximity-based meetup location suggestions for finding potential meetup opportunities between individuals and engaging therein. A plurality of user RSVP indications are employed where each user RSVP indication associated with a specific one user of a plurality of users and an associated meetup location designated by the specific one user for which the specific one user intends on being physically present at a future time. A set of matching user RSVP indications other users that match with the potential meetup locations selected by the user. The user is presented with the identified other RSVP users and there is a matching, based on at least an indication of mutual interest, between the user and the other users selected and matched such that a communications link is established between the user and such other users for purposes of meeting up.

17 Claims, 15 Drawing Sheets

(56) References Cited

U.S. PATENT DOCUMENTS

| | | | |
|---|---|---|---|
| 2013/0263020 A1* | 10/2013 | Heiferman | H04L 51/52 |
| | | | 715/753 |
| 2014/0047357 A1* | 2/2014 | Alfaro | G06Q 50/01 |
| | | | 715/753 |
| 2014/0320588 A1* | 10/2014 | Midtun | H04L 12/1895 |
| | | | 370/260 |
| 2015/0058324 A1* | 2/2015 | Kauwe | G06F 16/248 |
| | | | 707/722 |
| 2015/0127565 A1* | 5/2015 | Chevalier | G06Q 50/01 |
| | | | 705/319 |
| 2016/0267440 A1* | 9/2016 | LeBeau | G06Q 10/1095 |
| 2018/0025371 A1* | 1/2018 | Perriman | G06Q 10/02 |
| | | | 705/7.31 |
| 2019/0372796 A1* | 12/2019 | Moody | H04L 12/2838 |
| 2021/0004770 A1* | 1/2021 | Bansal | G06Q 10/1095 |

\* cited by examiner

SOCIAL NETWORKING MEETUP SYSTEM AND METHOD

CROSS-REFERENCE TO RELATED APPLICATION

This application claims the benefit of U.S. Provisional Application 63/305,517, filed Feb. 1, 2021, which is hereby incorporated by reference herein in its entirety.

FIELD OF THE INVENTION

The present invention relates generally to social media platforms, and more particularly, to a system and method that facilitates proximity-based meetup location suggestions for finding potential meetup opportunities between individuals.

BACKGROUND OF THE INVENTION

Social networking, dating, matchmaking, and searching for the right life partner are activities that have been around for ages and form an important part of the human condition. Further, establishing friendships with others is a hallmark of human life. However, today's fast-paced lifestyles and financial challenges have caused single individuals to come under increasing time pressures throughout every aspect of their life including work, school, and leisure. Many singles have little time left or the desire to engage in conventional dating due to these time pressure demands, and other individuals simply do not have time to find and establish lasting friendships with others. Furthermore, single individuals are more mobile than ever in terms of career and home base thereby increasing the difficulty to meet people for any type of social engagement. Also, individuals may have higher expectations of meeting the right person with whom they are compatible and with whom they have chemistry. For example, many singles are enlisting the use of electronic social networking services as a substitute for traditional dating means hoping to find a more convenient and effective dating experience. Conventionally, Web-based dating and telephone based dating are well-known alternative dating mechanisms. In Web-based, or online social networking meetup services, an individual first becomes a subscriber by completing a detailed profile and providing various details about themselves such as age, geographic location, physical characteristics, likes and dislikes. The individual then searches for others by entering similar criteria such as age range, geographic location, and desired physical characteristics. After searching, the individual can review the matching user profiles, which typically contain a photograph. The individual then decides which of the matching users they would like to potentially meet and sends them an e-mail in the hope of receiving a response. Users then get to know one another by initially exchanging e-mails that may then lead to a face-to-face meeting.

Web-based dating and other social media networking services, however, suffer from certain inherent drawbacks. For example, the sign-up process is cumbersome because users must complete lengthy questionnaires and typically compose essay-type matchmaking questions for other users to answer. This results in a certain rate of abandonment during the sign-up process. Further, it is difficult for an individual to assess other users and get a sense of what they are really like based on simply viewing their photograph, reading their profile and/or answers to a questionnaire. Also, email (or electronic text), given its impersonal nature, is not an effective means of communication for getting to know someone for the first time, and learning what they and their personality is really like. As such, the users must gauge chemistry purely from an exchange of textual data, thus leading to uncertainty whether a mutual attraction exists between two users. Ultimately, many shy people never end up making the first move for fear that the other person may not share a mutual interest. For others who misjudge mutual attraction, it can result in awkward or embarrassing situations, such as trying to end an unwanted conversation. Despite significant growth, the online dating and social networking industry continues to be plagued by the problem of users either misrepresenting themselves (e.g., as younger, more attractive, etc.) or concealing important information (e.g., a criminal record, a drug or alcohol addiction, sexually transmitted diseases, a marriage, etc.). These problems continue to chill the use by some users who are reticent about the success they may have when engaging such services and/or are fearful of whom they might meet.

Accordingly, there is need for a technique that improves online social networking services and the ability of a user to find, engage with and meet other individuals in a particular location that meet their particular social preferences.

SUMMARY OF THE INVENTION

The present invention is directed to providing a system and method that facilitates a platform providing proximity-based meetup location suggestions for finding potential meetup opportunities between individuals and engaging therein.

In a first implementation of the invention, a social networking meetup system is provided that enables the determination of proximity-based meetup location suggestions for finding potential meetup opportunities between individuals and engaging therein. The system comprising at least: a processor, a display and a memory storing instructions that when executed cause the processor to perform operations comprising: (i) receiving a plurality of user RSVP indications, each RSVP indication associated with a specific one user of a plurality of users and an associated meetup location designated by the specific one user for which the specific one user intends on being physically present at a future time; (ii) presenting, on a user device associated with a particular one user of the plurality of users, a plurality of potential meetup locations; (iii) receiving, from the user device associated with the particular one user, an indication that the particular one user is interested in at least one of the potential meetup locations presented; (iv) responsive to the indication that the particular one user is interested in at least one of the potential meetup locations presented, receiving a selection, from the user device associated with the particular one user, of the at least one of the potential meetup locations: (v) identifying a first set of matching user RSVP indications from the plurality of user RSVP indications of other users of the plurality of users that match with the at least one of the potential meetup locations selected; (vi) filtering the first set of matching user RSVP indications from the plurality of user RSVP indications of other users of the plurality of users identified to provide a first subset of matching user RSVP indications; (vii) presenting, on the user device associated with the particular one user, the first subset of matching user RSVP indications; (viii) receiving, from the user device associated with the particular one user, one or more selections from the first subset of matching user RSVP indications presented; (ix) matching, based on at least an indication of mutual interest, at least one of the other users associated with the one or more selections from the first subset of matching user RSVP indications with the particular one user; and (x) establishing a communications link between the particular one user and the at least one of the other users matched.

In a second aspect, a method is provided for delivering social networking meetup services that enable the determination of proximity-based meetup location suggestions for finding potential meetup opportunities between individuals and engaging therein. The method comprising (i) receiving a plurality of user RSVP indications, each RSVP indication associated with a specific one user of a plurality of users and an associated meetup location designated by the specific one user for which the specific one user intends on being physically present at a future time; (ii) presenting, on a user device associated with a particular one user of the plurality of users, a plurality of potential meetup locations; (iii) receiving, from the user device associated with the particular one user, an indication that the particular one user is interested in at least one of the potential meetup locations presented; (iv) responsive to the indication that the particular one user is interested in at least one of the potential meetup locations presented, receiving a selection, from the user device associated with the particular one user, of the at least one of the potential meetup locations; (v) identifying a first set of matching user RSVP indications from the plurality of user RSVP indications of other users of the plurality of users that match with the at least one of the potential meetup locations selected; (vi) filtering the first set of matching user RSVP indications from the plurality of user RSVP indications of other users of the plurality of users identified to provide a first subset of matching user RSVP indications; (vii) presenting, on the user device associated with the particular one user, the first subset of matching user RSVP indications; (viii) receiving, from the user device associated with the particular one user, one or more selections from the first subset of matching user RSVP indications presented; (ix) matching, based on at least an indication of mutual interest, at least one of the other users associated with the one or more selections from the first subset of matching user RSVP indications with the particular one user; and (x) establishing a communications link between the particular one user and the at least one of the other users matched.

In a third aspect, a user device is provided and configured for enabling the determination of proximity-based meetup location suggestions for finding potential meetup opportunities between individuals and engaging therein. The user device comprising at least a processor, a display and a memory storing instructions that when executed cause the processor to perform operations comprising (i) receiving a plurality of user RSVP indications, each RSVP indication associated with a specific one user of a plurality of users and an associated meetup location designated by the specific one user for which the specific one user intends on being physically present at a future time; (ii) presenting, on a user device associated with a particular one user of the plurality of users, a plurality of potential meetup locations; (iii) receiving, from the user device associated with the particular one user, an indication that the particular one user is interested in at least one of the potential meetup locations presented; (iv) responsive to the indication that the particular one user is interested in at least one of the potential meetup locations presented, receiving a selection, from the user device associated with the particular one user, of the at least one of the potential meetup locations; (v) identifying a first set of matching user RSVP indications from the plurality of user RSVP indications of other users of the plurality of users that match with the at least one of the potential meetup locations selected; (vi) filtering the first set of matching user RSVP indications from the plurality of user RSVP indications of other users of the plurality of users identified to provide a first subset of matching user RSVP indications; (vii) presenting, on the user device associated with the particular one user, the first subset of matching user RSVP indications; (viii) receiving, from the user device associated with the particular one user, one or more selections from the first subset of matching user RSVP indications presented; (ix) matching, based on at least an indication of mutual interest, at least one of the other users associated with the one or more selections from the first subset of matching user RSVP indications with the particular one user; and (x) establishing a communications link between the particular one user and the at least one of the other users matched.

In a fourth aspect, a social networking meetup services system application (alternatively referred to herein as an "app") may be executed on the social networking meetup services hosting system and/or the user device for executing the method operations that facilitate the social networking meetup services platform that enables the determination of proximity-based meetup location suggestions for finding potential meetup opportunities between individuals and engaging therein.

In another aspect, the user device may be a mobile device, smartphone, laptop computer, tablet and/or wearable device.

In another aspect, the social networking meetup services system app may be a mobile application executing on a mobile device.

In another aspect, a second set of matching user RSVP indications is identified from the plurality of user RSVP indications of other users of the plurality of users that are within a variable location proximity radius with respect to the at least one of the potential meetup locations selected.

In another aspect, the variable location proximity radius is adjusted by a user. In another aspect the variable location proximity radius is in a range of one (1) to three (3) miles.

In another aspect, the second set of matching user RSVP indications is filtered to provide a second subset of matching user RSVP indications from which the user may select in order to establish a communications link and meetup.

In another aspect, the plurality of potential meetup locations ordered based on a number of total RSVPs for each of the potential meetup locations. In another aspect, the plurality of potential meetup locations is presented in accordance with the ordering of the plurality of potential meetup locations. In another aspect, the ordering is presented from the largest number of total RSVPs to the smallest number thereof.

In another aspect, a third set of matching user RSVP indications identified from the plurality of user RSVP indications of other users of the plurality of users that match with the at least one of the potential meetup locations selected wherein the other users were previously present at the at least one of the potential meetup locations during a specified time interval, but the communications link was never established with the particular one user. In another aspect, the third set of matching RSVP indications is filtered using a user profile.

In another aspect, the specified time interval for determining when users were previously present at potential meetup location is a twenty-four (24) hour interval.

In another aspect, one of more of the RSVP indications associated with the specific one user of the plurality of users designates an associated meetup location that the specific one user has an interest to be present at some future time.

In another aspect, the plurality of potential meetup locations comprise one or more venues, places of interest, events, and user-specified geographic locations.

In another aspect, a "go live" designation is provided indicating a user wishes to publish their respective current real-time location to the other users of the plurality of users but only those other user that are within a variable location proximity radius of the current real-time location of the user.

In another aspect, a go live designation is provided indicating that the other users wish to publish their respective current real-time location.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in the Figures herein. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed toward a social networking meetup system and method that enables individuals to identify potential future meetup opportunities (employing a so-called user RSVP indication) such that the user has the ability to find, engage with and meet other individuals in a particular location (e.g., venues, events, places of interest (POI) and other specific locations) that meet their particular meetup characteristics. In this way, the system and method enables the identification of and engagement for an individual with other individuals who may be going to and/or attending a particular event, for example, at some future time using a new and unique social networking meetup platform. In this way, the disclosed embodiments address problems with existing social networking services platforms by providing an alternative social networking services platform which allows users to quickly meetup with prescreened matches (e.g., within a pre-selected location radius) with other individuals for increased comfort and safety. Importantly, the social networking meetup system and method of the disclosed embodiments provide an advantageous improvement of practical applications that include social networking platforms and/or location-based services platforms.

Figure 1:
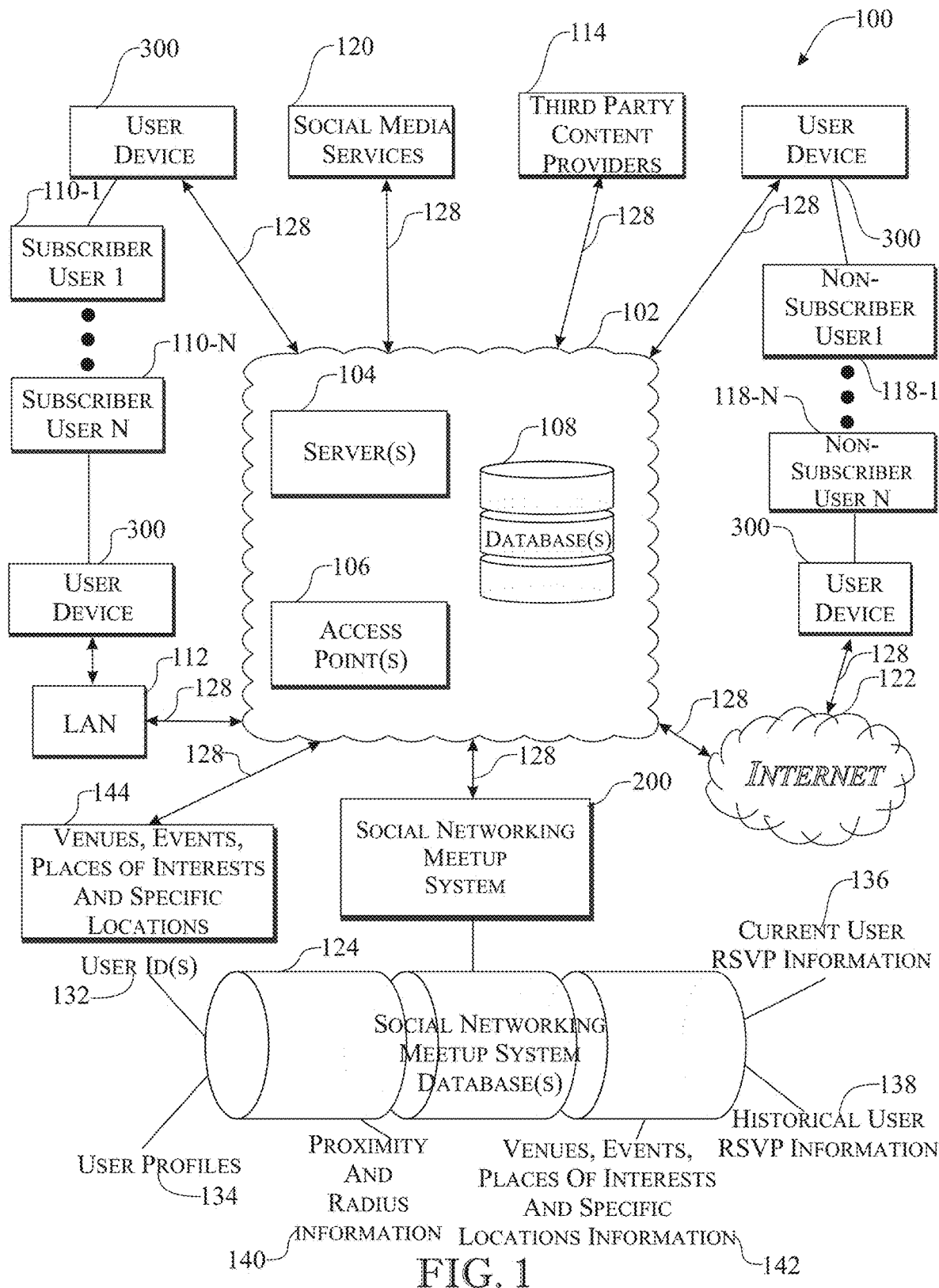
FIG. 1 presents a high-level block diagram of a cloud network services architecture for providing a social networking meetup system in accordance with an embodiment.

FIG. 1 presents a high-level block diagram of social networking meetup services system 100 comprising a social networking meetup services cloud 102 for executing social networking meetup services to subscribed users and/or non-subscribed user in accordance with an embodiment. As shown for instance in FIG. 1, the social networking meetup services system 100 includes the social networking meetup services cloud 102 comprising at least server(s) 104, access point(s) 106 and database(s) 108. As will be detailed herein below, the social networking meetup services cloud 102 facilitates the delivery of social networking meetup services to a plurality of users (e.g., comprised by subscriber user 1 110-1 through subscriber user N 110-N and/or non-subscriber user 1 118-1 through non-subscriber user N 118-N) whereby the individuals employ RSVP indications (also referred to herein as user RSVP indications) wherein each RSVP indication specifies a future meetup location that the user plans to be present at some future time or has an interest to be present at that meetup location at some future time. As used herein the term "user" means any person that engages (whether a subscribed user or a non-subscribed user) to the social networking meetup services offered by and through the social networking meetup services system 100 using a social networking meetup app 400, as will be detailed herein below, on the user device 300. The user device 300 provides subscribed users (e.g., subscriber user 1 110-1 through subscriber user N 110-N) with real-time access to social networking meetup services in accordance with the disclosed embodiments herein. Thus, as used herein the terms "RSVP", "RSVP indication" and/or "user RSVP indication" mean a future meetup location that the user plans to be present at some future time or has an interest to be present at that meetup location at some future time (e.g., that day, that evening or in one week). In an embodiment, the social network meetup processing, offered by and through the cloud network services architecture 100 and the social networking meetup system 200 will be facilitated by the social networking meetup app 400 (see, FIG. 4), as will be detailed herein below, executing on the user device 300 (see, FIG. 3). The user device 300 provides the various users (e.g., subscriber user 1 110-1, subscriber user N 110-N, non-subscriber user 1 118-1, and/or non-subscriber user N 118-N) with real-time access to social networking meetup services in accordance with the disclosed embodiments herein.

As noted above, the cloud 102 comprises at least server(s) 104, the access point(s) 106 and the database(s) 108. Cloud, cloud service, cloud server and cloud database are broad terms and are to be given their ordinary and customary meaning to one of ordinary skill in the art and includes, without limitation, any database, data repository or storage media which store content typically associated with and managed by a user, social networking services providers, social networking opportunities (e.g., venues, events, places of interest, and specific locations 144), social media services (e.g., social media services 120) and third-party content providers (e.g., third-party content providers 114) in the context of social networking services, to name just a few. A cloud service may include one or more cloud servers and cloud databases that provides for the remote storage of content as hosted by a third-party service provider or operator. A cloud server may include an HTTP/HTTPS server sending and receiving messages in order to provide web-browsing interfaces to client web browsers as well as web services to send data to integrate with other interfaces (e.g., as executed on the user device 300). The cloud server may be implemented in one or more servers and may send and receive content in a various forms and formats, user supplied and/or created information/content and profile/configuration data that may be transferred from or stored in a cloud database (e.g., the databases 108).

A cloud database may include one or more physical servers, databases or storage devices as dictated by the cloud service's storage requirements. The cloud database may further include one or more well-known databases (e.g., an SQL database) or a fixed content storage system to store content, user profile information, configuration information, administration information and any other information necessary to execute the cloud service. In various embodiments, one or more networks providing computing infrastructure on behalf of one or more users may be referred to as a cloud, and resources may include, without limitation, data center resources, applications (e.g., software-as-a-service or platform-as-a-service) and management tools.

Figure 2:
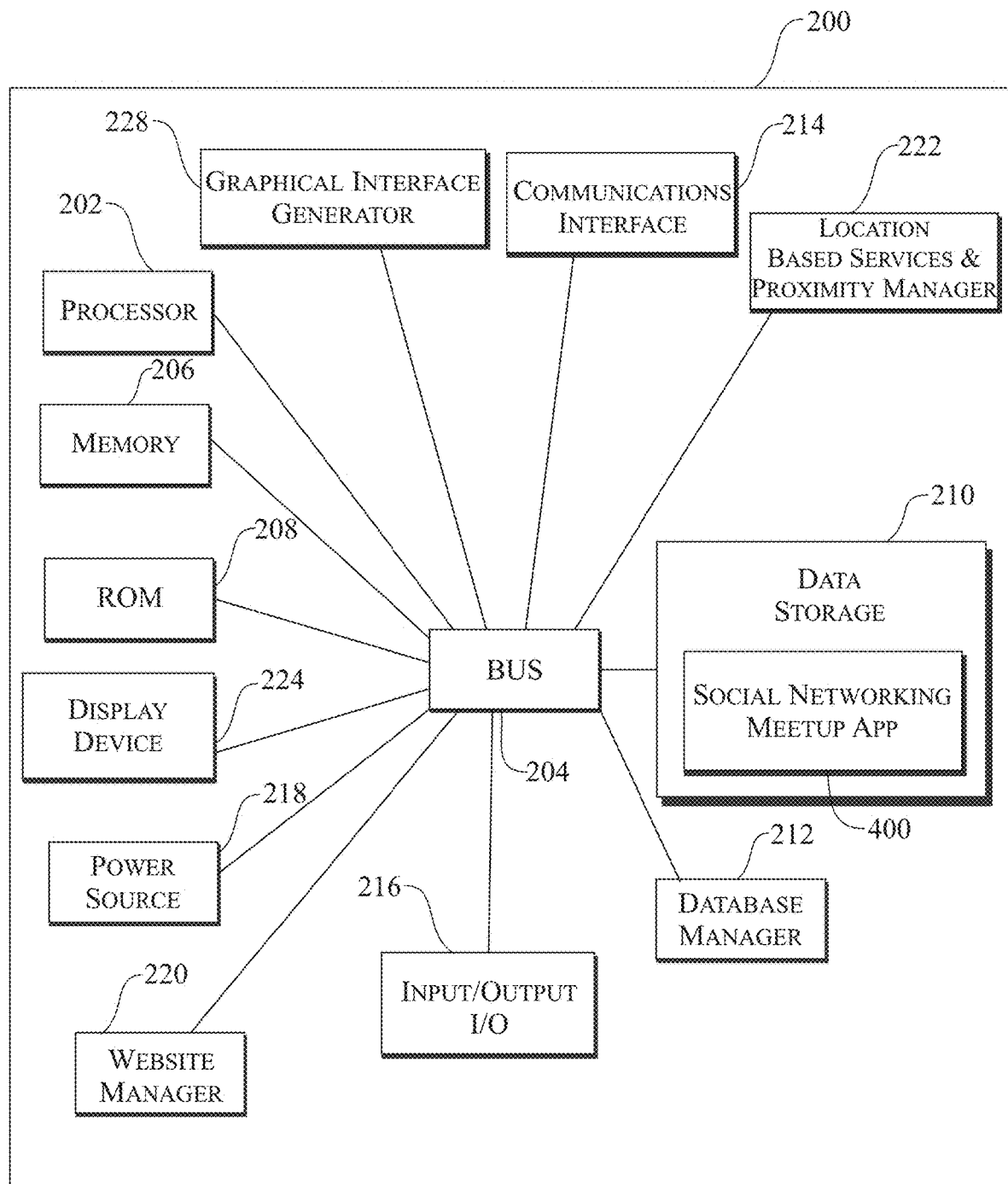
FIG. 2 presents an illustrative social networking meetup system in accordance with an embodiment.

Turning our attention to FIG. 2, an illustrative configuration for the social networking meetup system 200 is shown for deployment in the cloud network services architecture 100 in accordance with an embodiment. As shown, the social networking meetup system 200 comprises processor 202 for executing program code (e.g., social networking meetup app 400) and communications interface 214 for managing communications to and from the social networking meetup system 200, memory 206 and/or read-only memory (ROM) 208 for storing program code and data, and power source 218 for powering the social networking meetup system 200. The memory 206 is coupled to the bus 204 for storing computer-readable instructions to be executed by the processor 200 (e.g., execution of the social networking meetup app 400). Database manager 212 is used to manage the delivery and storage of content, data, and other information in the social networking meetup system database(s) 124, database(s) 108 and across third-party content providers, for example. The social media system database(s) 124 may store and provide information including, but not limited, to user IDs 132, user profiles 134, current user RSVP information 136, historical user RSVP information 138, proximity and radius information 140, and venues, events, places of interest (POI), and specific locations information 142. As will be detailed further herein below, the operations performed by for the social networking meetup system 200 in combination with the social networking meetup app 400, for example, provide for a social networking meetup technique that enables individuals to meetup in a rapid and safe manner with a higher degree of potential compatibility.

Website manager 220 is used to deliver and manage content, data, and other information across one or more websites that may be utilized to access and use the social networking meetup system 200, for example. Further, the operations provided by and through the social networking meetup app 400 may be offered through a web-based application. As will be discussed in greater detail herein below, the social networking meetup app 400, as stored in data storage 210, when executed by the processor 202 will enable access by a plurality of parties (e.g., subscriber user 1 110-1 through subscriber user N 110-N and/or non-subscriber user 1 118-1 through non-subscriber user N 118-N) to the social networking meetup system 200 for the processing of, for example, the user LDs 132, user profiles 134, current user RSVP information 136, historical user RSVP information 138, proximity and radius information 140, and venues, events, places of interest (POI), and specific locations information 142. Location-based services manager 222 facilitates the delivery of location-based services (e.g., GPS tracking) either independently or on user device 300 thereby allowing the social networking meetup system 200 to register the exact location of the user of the user device 300, for example, as the subscriber user 1 110-1 roams from one location to another location such that the services offered via the social networking meetup processing hereunder may be tailored to a current location and/or the needs of the user (e.g., the subscriber user 1 110-1 or the non-subscriber user 1 118-1) may change based on their current location and a particular social encounter.

In an embodiment, the social networking meetup processing provided through the execution of the social networking meetup app 400 may also include a web-based delivery platform and/or accessing and interfacing any number of websites using website manager 220 for procuring information and data that can be used in the social networking meetup system 200. The term "website" in the context herein is used in a conventional and broadest sense and is located on at least one server containing web pages stored thereon and is operational in a 24-hour/7-day typical fashion. Further, as shown in the cloud network services architecture 100, the plurality of parties (i.e., subscriber user 1 110 through subscriber user N 110-N and/or non-subscriber user 1 118-1 through non-subscriber user N 118-N) may alternatively utilize well-known Internet 122 for access to social networking meetup system 200 by and through a web browser on the user device 300, for example. The user device 300 may also include one or more input/output devices 216 that enable user interaction with the user device 300 (e.g., camera, display, keyboard, mouse, speakers, microphone, buttons, etc.). The input/output devices may include peripherals, such as an NFC device (e.g., NFC tag reader), camera, printer, scanner (e.g., a QR-code scanner), touchscreen display, etc. For example, the input/output devices 216 may include a display device such as a cathode ray tube (CRT), plasma monitor, liquid crystal display (LCD) monitor or organic light-emitting diode (OLED) monitor for displaying information to the user, a keyboard, and a pointing device such as a mouse or a trackball by which the user can provide input to the user device 300 or an associated display device 224, for example, that may also be managed by graphical user interface generator 228.

The communications interface 214 is used to facilitate communications across the communications links 128 (see, FIG. 1) within the cloud network services architecture 100. This may take the form, for example, of a wide area network connection that communicatively couples the social networking meetup system 200 with the access points 106 (see, FIG. 1) which may be a cellular communications service. Similarly, communications managed by the communications interface 214 may take the form, for example, of a local Wi-Fi network interface or Ethernet interface the communicatively couples the social networking meetup system 200 with the Internet 122, LAN 112, and ultimately the user device 300. In the instant embodiment, the social networking meetup app 400 and/or the communications interface 214 may include a communications stack for facilitating communications over the respective communications link 128. Electronic communications by and through social networking meetup system 200 between the various systems, networks, devices, users, entities, and/or individuals are facilitated by the communications links 128 in accordance with any number of well-known communications protocols and methods (e.g., wireless communications).

Figure 3:
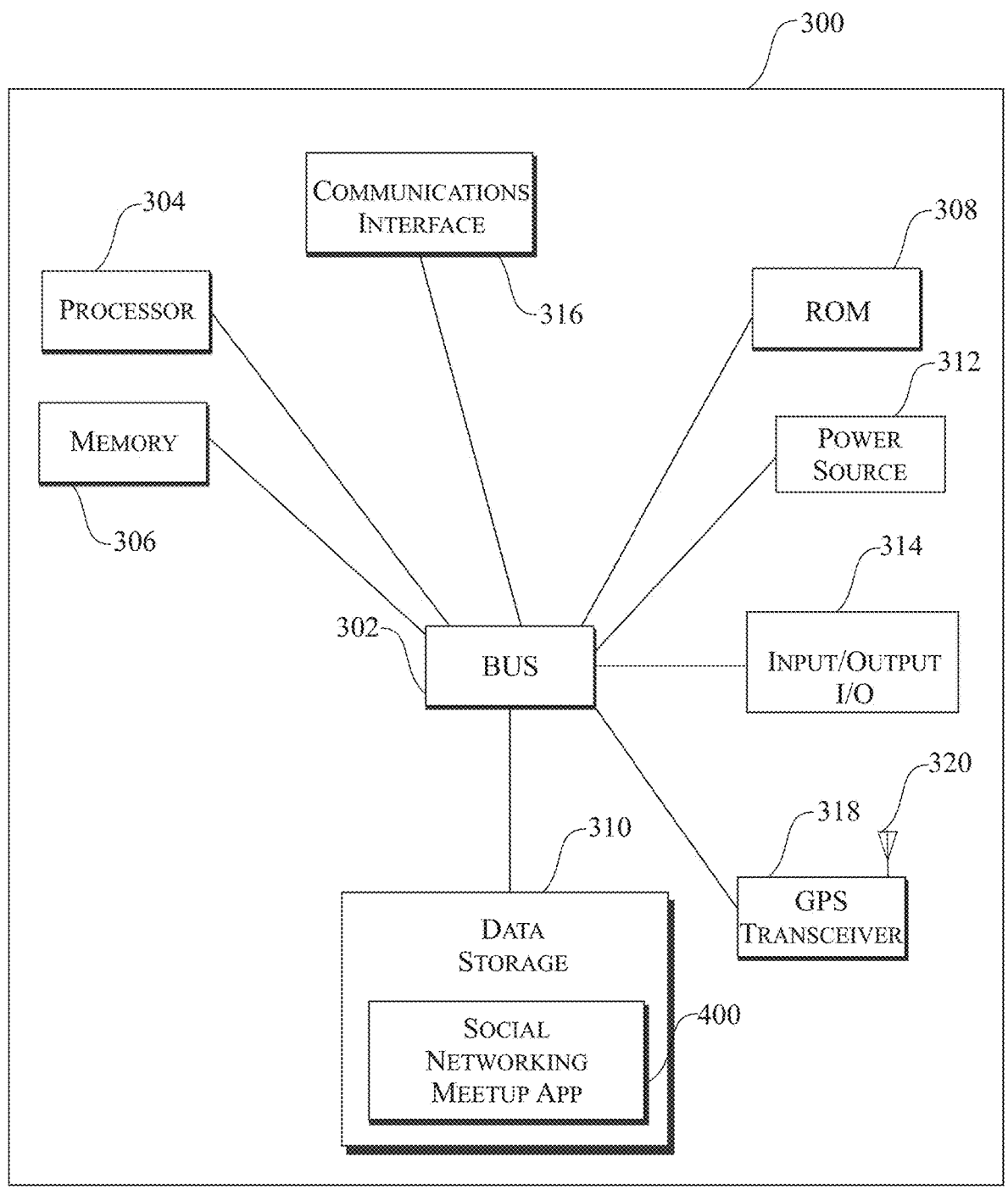
FIG. 3 presents an illustrative user device configured for use with the social networking meetup system of FIG. 2 in accordance with an embodiment.

Turning our attention briefly to FIG. 3, an illustrative user device 300 is shown for use with the social networking meetup system of FIG. 2 in accordance with an embodiment. The user device 300 typically includes bus 302 and processor 304 coupled to the bus 302 for executing operations and processing information. As will be appreciated, a "user device" in the context herein may comprise a wide variety of devices such as any type of hardware device, mobile devices, smartphones, laptop computers, desktop computers, tablets, and wearable devices, to name just a few, that execute applications (e.g., a mobile application) in accordance with the principles of the disclosed embodiments herein. For example, the execution of the social networking meetup app 400 as will be discussed in much greater detail herein below. The processor 304, as powered by power source 312, may include both general and special purpose microprocessors, and may be the sole processor or one of multiple processors of the device. This is equally applicable to the processor 202 of FIG. 2. Further, the processor 304 (or the processor 202) may comprise one or more central processing units (CPUs) and may include, be supplemented by, or incorporated in, one or more application-specific integrated circuits (ASICs) and/or one or more field programmable gate arrays (FPGAs).

The user device 300 may also include memory 306 coupled to the bus 302 for storing computer-readable instructions to be executed by the processor 304. The memory 306 may also be utilized for storing temporary variables or other intermediate information during the execution of the instructions by the processor 304. The user device 300 may also include ROM 308 or other static storage device coupled to the bus 302. Further, data storage device 310, such as a magnetic, optical, or solid-state device may be coupled to the bus 302 for storing information and instructions for the processor 304 including, but not limited to, the social networking meetup app 400. Data storage device 310 (or the data storage device 210) and the memory 306 (and the memory 206) may each comprise a non-transitory computer readable storage medium and may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

The user device 300 may also include one or more communications interface 316 for communicating with other devices via a network (e.g., a wireless communications network) or communications protocol (e.g., Bluetooth®). For example, such communication interfaces may be a receiver, transceiver, or modem for exchanging wired or wireless communications in any number of well-known fashions. For example, the communications interface 316 (or the communications interface 214) may be an integrated services digital network (ISDN) card or modem/router used to facilitate data communications of various well-known types and formats. Further, illustratively, the communications interface 316 (or the communications interface 214) may be a local area network (LAN) card used to provide data communication connectivity to a comparable LAN. Wireless communication links may also be implemented. The Global Positioning System (GPS) transceiver 318 and antenna 320 facilitate delivery of location-based services in order to register the exact location of the user device 300, for example, as the user roams from one location to another location. As will be understood, the application herein will be able to track individual users and their location (and proximities to other locations) upon the launching of the application thereby enabling the well understood GPS location features of the user device 300 (e.g., a smartphone).

As will be appreciated, the functionality of the communication interface 316 (or the communications interface 214) is to send and receive a variety of signals (e.g., electrical, optical, or other signals) that transmit data streams representing various data types. The user device 300 may also include one or more input/output devices 314 that enable user interaction with the user device 300 such as a camera, display, keyboard, mouse, speakers, microphone, buttons, etc. The input/output devices 314 (or I/O devices 216) may include peripherals, such as an NFC device (e.g., NFC reader), camera, printer, scanner (e.g., QR-code scanner), touchscreen display, etc. For example, the input/output devices 314 (or the 110 devices 216) may include a display device such as a cathode ray tube (CRT), plasma monitor, liquid crystal display (LCD) monitor or organic light-emitting diode (OLED) monitor for displaying information to the user, a keyboard, and a pointing device such as a mouse or a trackball by which the user can provide input to the user device 300 or an associated display device, for example.

Figure 5:
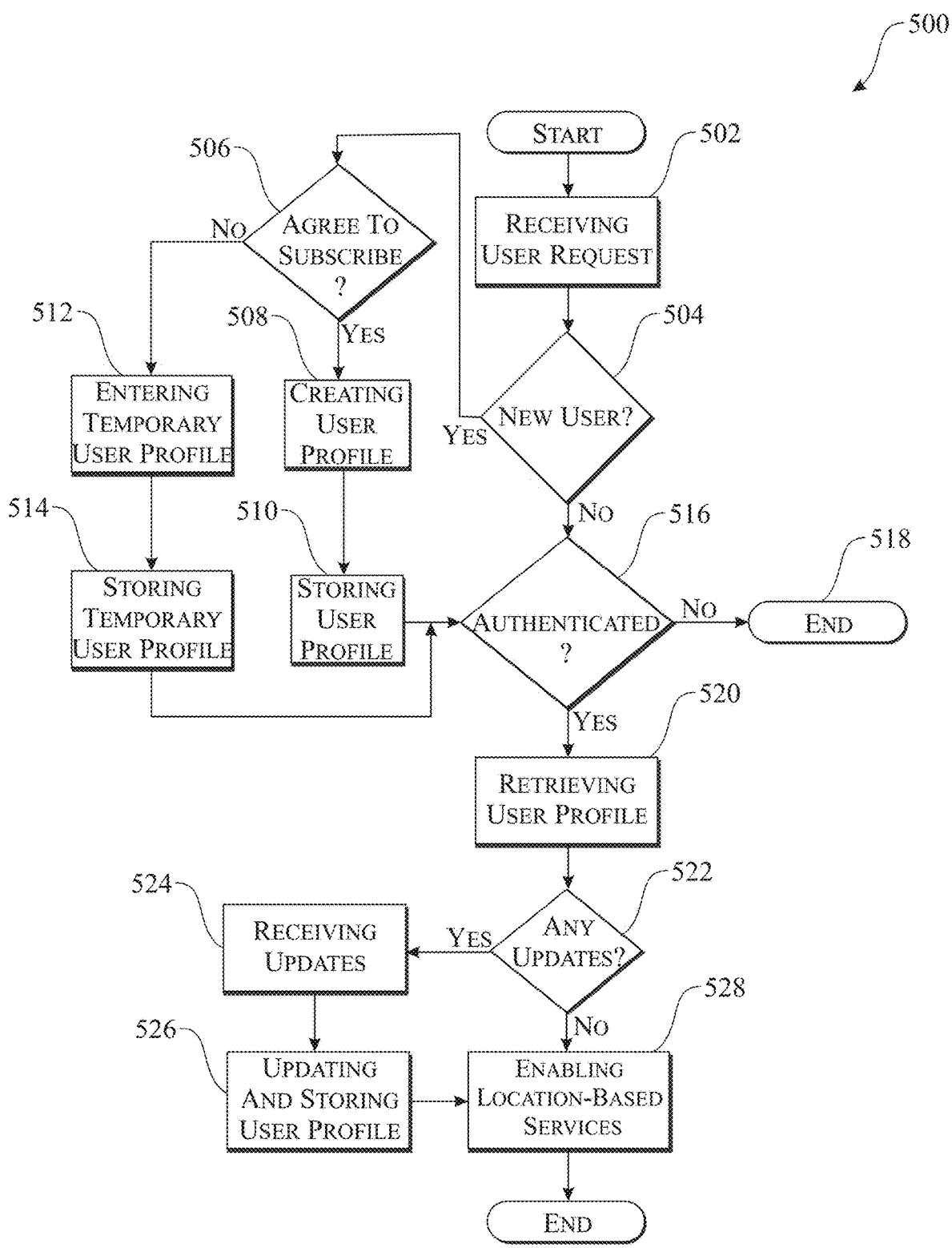
FIG. 5 presents a flowchart of illustrative operations for user onboarding and subscription in accordance with an embodiment.

Turning our attention to FIG. 5, a flowchart of illustrative operations 500 is shown for user onboarding and subscription in accordance with an embodiment. As noted above, the disclosed embodiments herein contemplate a subscription-based service for use by the users but may also be used in a free or non-subscribed platform. As such, at step 502, receiving a user request (e.g., the subscriber user 1 110-1 or the non-subscriber user 1 118-1). At step 504, determining if a user is a new or returning user and, if a new user, then at step 506 determining whether the user is a subscriber or not (e.g., in accordance with a user agreement and/or user privacy/security agreement). If so, then the new user is subscribed and, at step 508, a user profile is created and the user profile is stored, at step 510. In accordance with the principles of the embodiments hereunder, the user profile may comprise, among other information, at least the user's name, social security number or other unique identifier, a user ID, and a set of meetup preference criteria and other associated information. Illustratively, the user profile will be used in various embodiments to filter certain meetup results in order to present the user with a filtered set of meetup candidates that most closely resemble their meetup preference criteria. If the user declines to become a subscriber, then they may proceed as a non-subscriber (e.g., the non-subscriber 1 118-1) and will be entering, at step 512, a temporary user profile and storing the user profile at step 514. Illustratively, such temporary user profile may be an abbreviated version of the aforementioned subscriber's user profile but should at least contain the non-subscriber's meetup preference criteria and other associated information for use in the filtering operations detailed herein. If the user is a returning user (or one of the newly subscribed users or new non-subscribed user), their identity is authenticated, at step 516 (e.g., using the aforementioned user ID 132). In an embodiment, two-factor authentication is used to verify the user's credentials (e.g., a text message to the user device 300 associated with this user). If not authenticated, then the operations end at step 518, and if they are authenticated then, at step 520, their respective user profile is retrieved. A determination is made, at step 522, as to whether any updates to the user profile are desired and if so, then at step 524, receiving the update, and updating and storing the user profile, at step 526. If no updates are necessary (or after the updating operations are completed), at step 528, there is an enablement of location-based services (e.g., on the user device 300 associated with the user, for example, the subscriber user 1 110-1) to facilitate the proximity-based operations detailed herein.

Figure 6A:
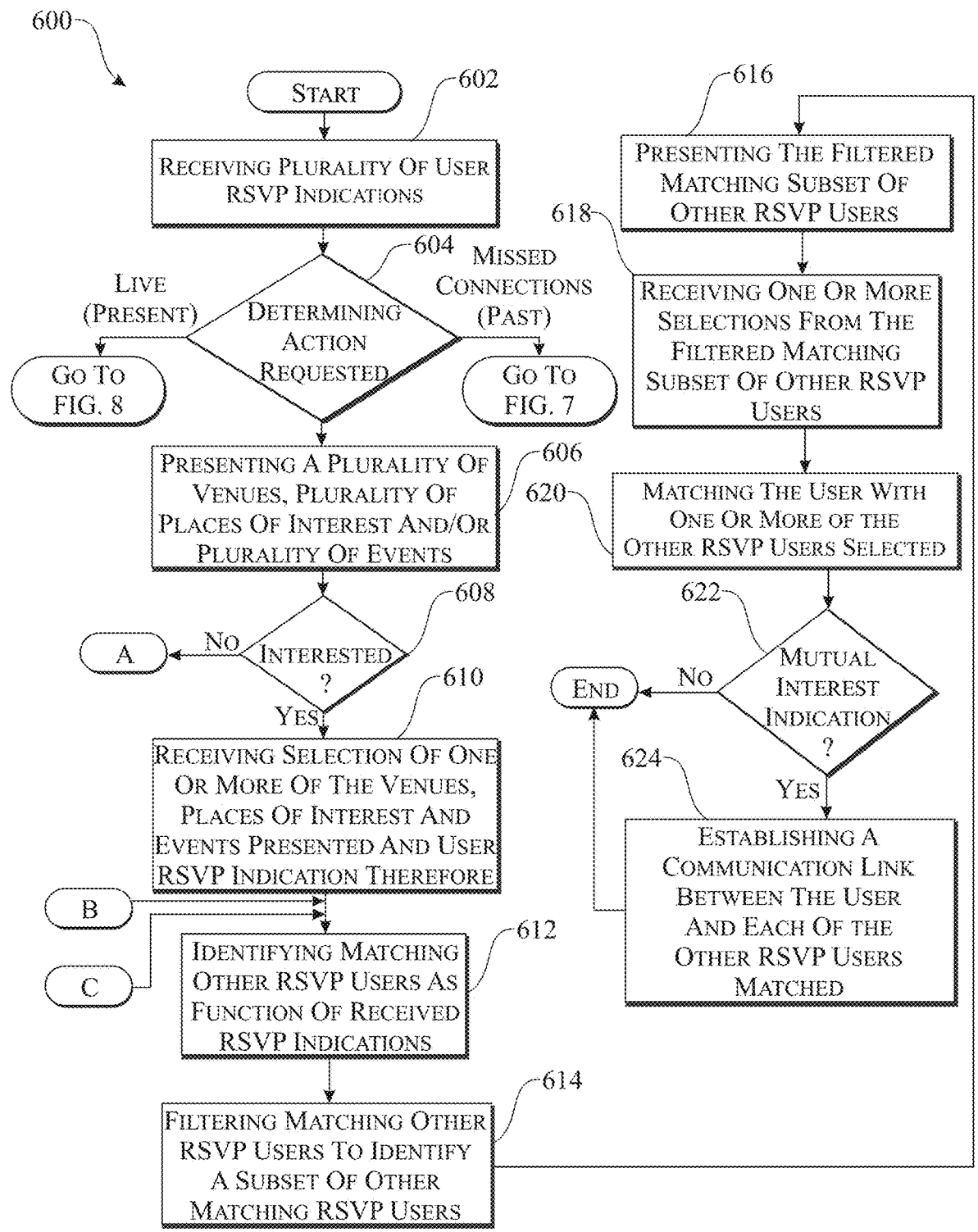
FIGS. 6A and 6B presents a flowchart of illustrative operations for providing user RSVP features in the delivery of social networking meetup services in accordance with an embodiment.

Turning our attention to FIG. 6A, a flowchart of illustrative operations 600 for providing user RSVP features in the delivery of social networking meetup services in accordance with an embodiment. More particularly, at step 602, receiving a plurality of user RSVP indications wherein each RSVP indication is associated with a specific one user of a plurality of users and an associated meetup location designated by that specific one user for which the specific one user intends on being present (e.g., physically or virtually) at a future time. This important feature of the disclosed embodiments provides the user with the ability to select a particular meetup location (e.g., venues, events, places of interests and/or user-specified locations) that they will be present at for a specific time (e.g., a particular day) and then be shown other users who have selected (i.e., provided an RSVP indication) for that same particular meetup location. At step 604, a determination is made as to the operation type that is desired. That is, as will be detailed further herein, in the subject embodiment there are three basic operation types: RSVP (future), missed opportunities (past) and live (present). The latter two operation types are the subject of the discussion herein below with respect to FIG. 7 and FIG. 8, respectively. As shown in FIG. 6, if the RSVP (future) operation type (and execution thread) is desired then, at step 606, presenting a plurality of venues, places of interest, and/or plurality of events. Illustratively, in an embodiment, the user will be presented with a plurality of tabs (e.g., on the user device 300 associated with subscriber user 1 110-1) including a search bar. The tabs will show the user a listing of nearby venues (e.g., local bars, nightclubs, malls, etc.), a listing of nearby places of interest (e.g., a museum) and/or a listing of events (e.g., a concert). The search bar provides for the user to input a specific venue, place of interest, event and/or a specific geographic location. At step 608, a determination is made as whether the user is interested in any of the potential meetup locations presented. If so, at step 610, receiving a selection of one or more of the potential meetup locations (e.g., one or more of the venues, places of interest and events) and the user's RSVP indication therefore. Then, at step 612, identifying matching other RSVP users as a function of the received user RSVP indication. That is, the plurality of user RSVP indications that are stored (e.g., in the social networking meetup system database(s) 124) are searched for matches. These matching results are filtered, at step 614, to identify a subset of other matching RSVP users. That is, as detailed above, the filtering may employ the user profile associated with the user to filter these match user RSVP results using the user's previously indicated meetup preference criteria and other associated information when entering their user profile. Importantly, the social networking meetup service users may only engage and communicate with other users, on an initial basis, which have provided RSVP indications to the same potential meetup location. So, while the users may be able to determine a number of potential meetup candidates, they will not be able to access and review user profiles of other users and will not be able to initiate communication unless and until each of them are "RSVP'd" at a particular meetup location. Advantageously, this removes, for example, the downside of encountering an individual with a falsified user profile as can happen with conventional social networking/dating applications and also removes an additional downside of encountering so-called "stalker" situations. That is, the user is able to have a real-time visual of the other user at the meetup location to ensure their image matches that of their user profile before their selection.

At step 616, presenting the filtered matching subset of other RSVP users to the user and, at step 618, receiving one or more selections from the presented filtered matching subset of other RSVP users. In this way, the user (e.g., the subscriber user 1 110-1) may review other users who have matched the RSVP indications (i.e., both the user and the other users have indicated an intention to be at the same meetup location at some time in the future). Illustratively, the user may employ their associated user device (e.g., the user device 300) to view the presented other users and swipe left for "yes" or swipe right for "no" (as will detailed further herein below) in attempting to match with another user who has "RSVP'd" the same meetup location. If there is an indication of mutual interest, at step 622, then establishing a communications link, at step 624, between the user and each of the other RSVP users for which a "yes" has been indicated in the matching operation. This communications link may come in any number of forms including, but not limited to, emails, text messages, and phone calls, to name just few. Using the established communications line, the user and the matched other RSVP parties can determine whether they desire to continue the meetup and/or a longer term relationship.

Figure 6B:
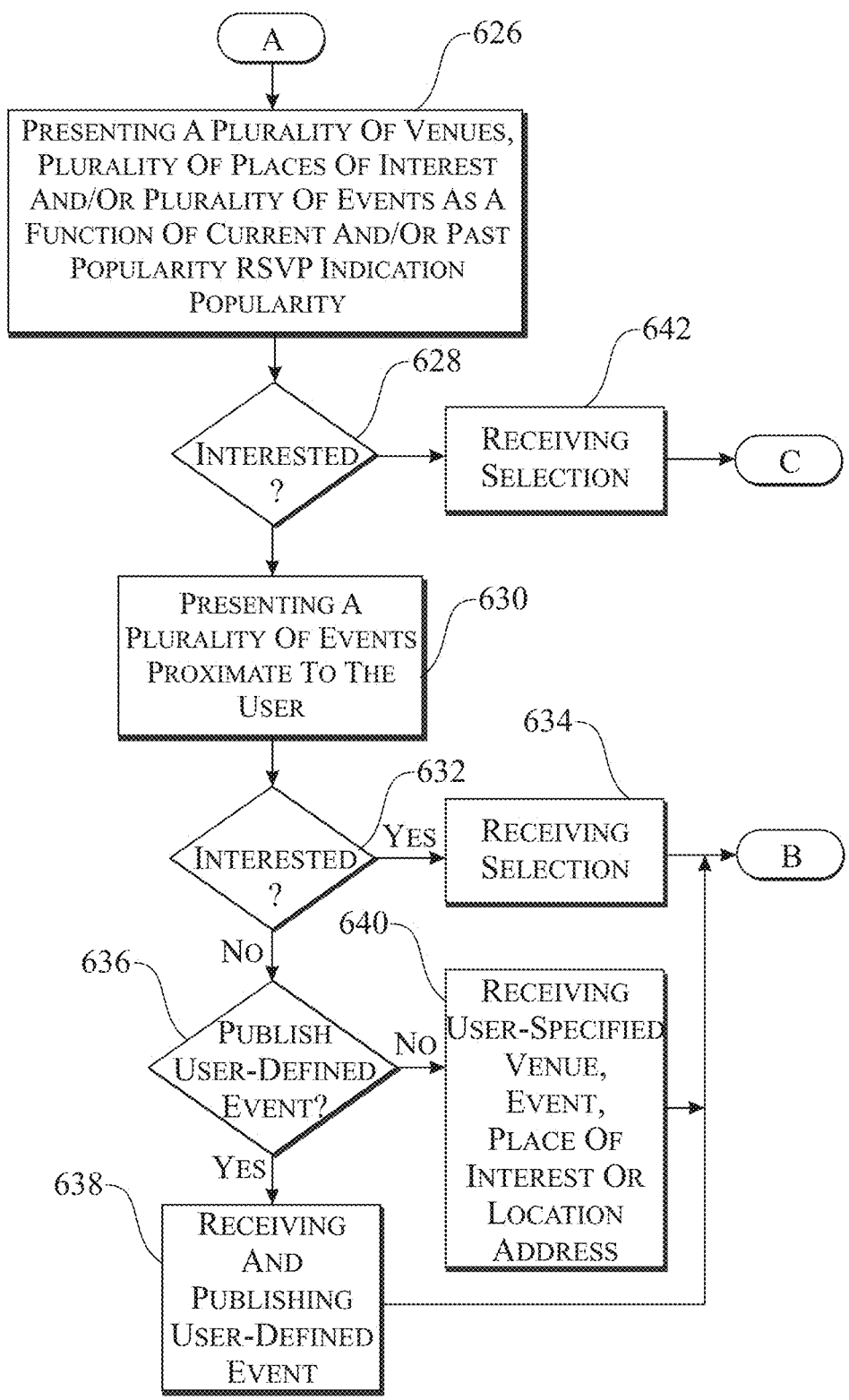

If at step 608, the user indicated no interest in any of the potential meetup locations presented, then at step 626, presenting a plurality of venues, places of interest and/or events as a function of a current and/or past popularity RSVP indication (see, FIG. 6B). In an embodiment, a "what's hot tab" will be employed that will show an immediate listing on the user device 300 that will be directed to the most popular venues, places of interest, and events based on a particular measure (e.g., most popular for a particular day or most popular over the past week). At step 628, a determination is made as to whether the user has any interest in the presented most popular venues, places of interest, and events. If so, then receiving a selection, at step 642, and the operations continue at step 612, as detailed above. If no interest is indicated in any of the most popular venues, places of interest and event, then presenting a plurality of event that are proximate to the user, at step 630. That is, using a defined location proximity radius (e.g., one (1) mile) a listing of events within such proximity radius will be presented to the user. At step 632, a determination is made as to whether the user has any interest is any of the present proximate events and if so, then at step 634, receiving a selection and the operations continue at step 612, as detailed above. If no interest is indicated in any of the proximally located event, then the user, at step 636, is able to publish their own user-defined event as an option and, at step 638, receiving and publishing the user-defined event and the operations continue at step 612, as detailed above. Otherwise, at step 640, receiving a user specified venue, event, place of interest or specific location address and the operations continue at step 612, as detailed above.

Figure 7:
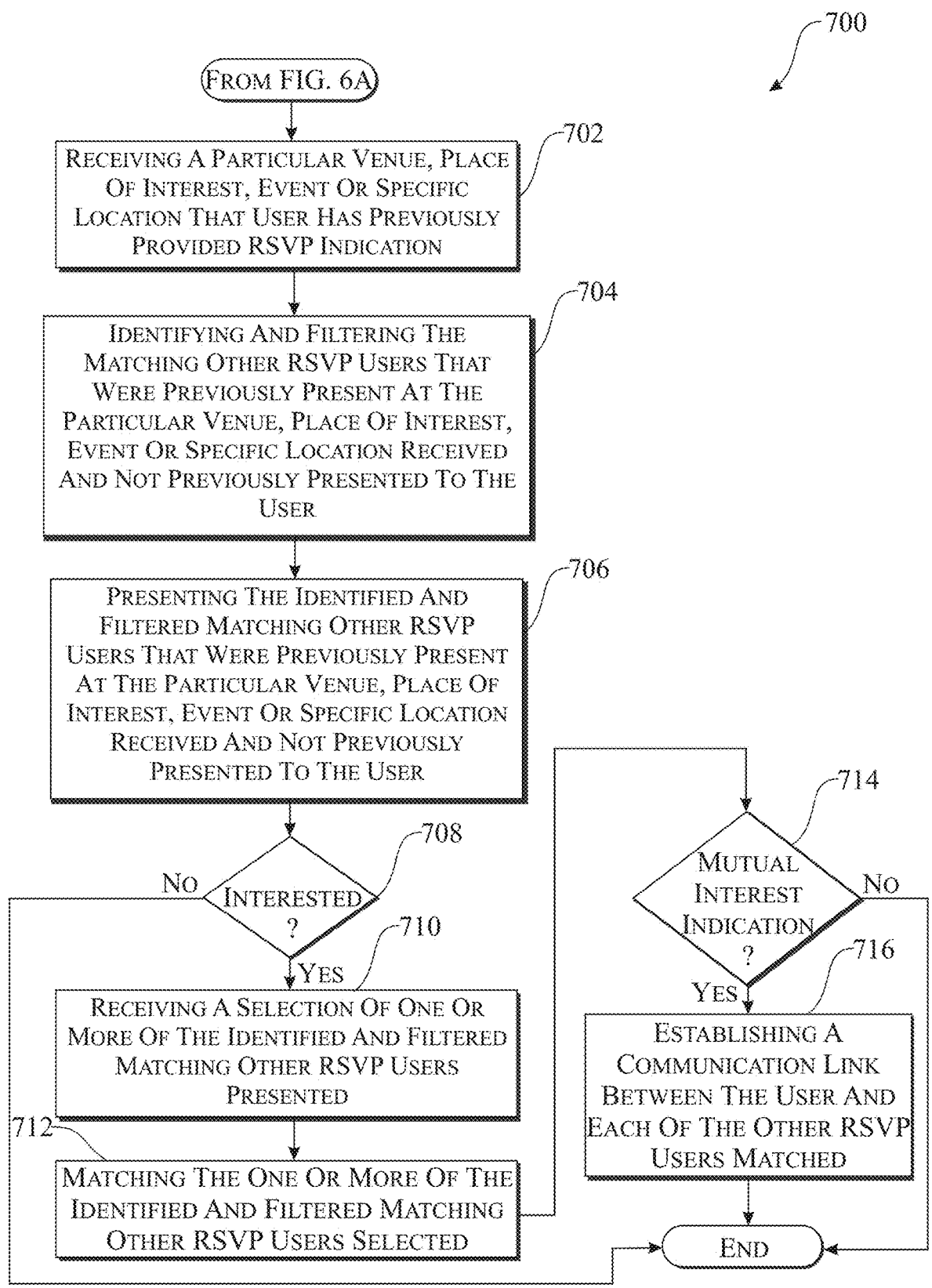
FIG. 7 presents a flowchart of illustrative operations for providing user missed connections RSVP features in the delivery of social networking meetup services in accordance with an embodiment.

As shown in FIG. 6A, if the missed connections operation type (and execution thread) is desired then operations 700 of FIG. 7 are executed. As shown, a flowchart of the illustrative operations 700 is shown for providing user missed connections RSVP features in the delivery of social networking meetup services in accordance with an embodiment. More particularly, in this embodiment, the operations facilitate identifying and presenting to a user those other users that have previously "RSVP'd" with respect to a particular meetup location that the user has also "RSVP'd" and for which that user did not have an opportunity to connect with such other users. For example, "User A" may have "RSVP'd" a specific geographical location for which they intended to be at during an earlier part of the day (e.g., between the hours of 8-10 AM). As such, the user may match with another user (e.g., "User B"). In the instant example, however, both Users A and B do match but physically go to that location between the hours of 1-3 PM. Now, another user (e.g., "User C") at some time later "RSVP'd" (e.g., 5 PM) to that same geographical location that both Users A and B were at earlier but have since departed. User C due to the time differential in the respective RSVPs is not able to connect with either User A or User B, however, in accordance with the instant embodiment, User C may still meetup with and connect with User A and/or User B. In particular, at step 702, receiving a particular meetup location (e.g., a particular venue, place of interest, event, or specific location) that the user has previously provided an RSVP indication. At step 704, identifying and filtering the matching other RSVP user that were previously present at the particular meetup location and not previously presented to the user (i.e., the user was unable to establish a meetup communication), and, at step 706, presenting such identified and filtered matching other RSVP users to the user. At step 708, determining if the user has an interest in any of such other RSVP users and if not, then the operations end. If interested, then, at step 710, receiving a selection of one or more of the identified and filtered matching other RSVP users from the user and matching, as step 712, the one or more of the identified and filtered matching other RSVP users with the user. At step 714, determining if there is a mutual interest indicated between the user and such matched other RSVP users. If not, the operations end. If there is an indication of mutual interest, then, at step 716, establishing a communications link between the user and the each of the one or more of the identified and filtered matching other RSVP users selected and for which there is the mutual interest. Illustratively, the social networking meetup system 200 will refresh the missed connections at some regular interval (e.g., every twenty-four (24) hours) so that a user is able to access an up-to-date pool of potential missed connections based on their RSVP activity.

Figure 8:
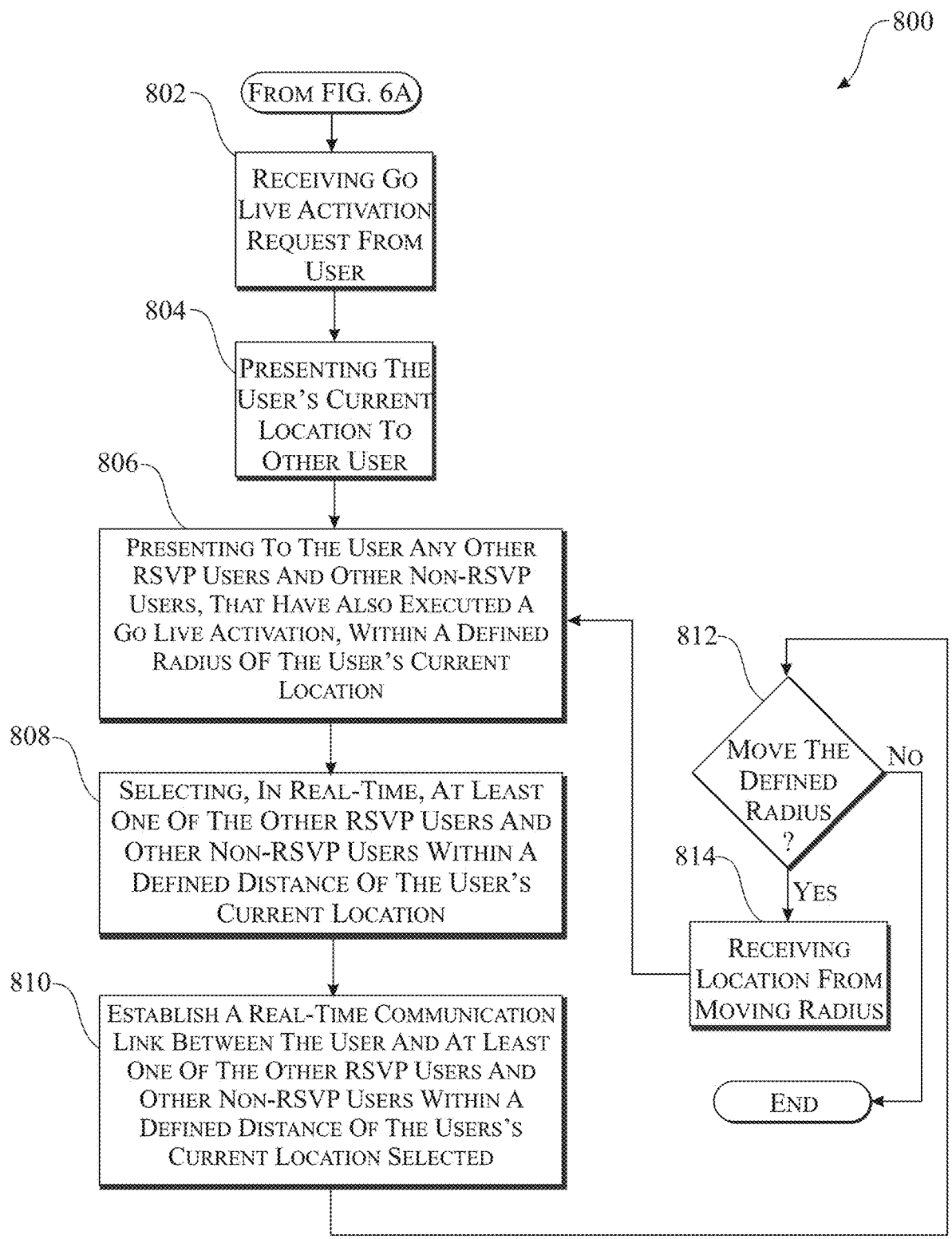
FIG. 8 presents a flowchart of illustrative operations for providing user go live features in the delivery of social networking meetup services in accordance with an embodiment.

As shown in FIG. 6A, if the go live (present) operation type (and execution thread) is desired then operations 800 of FIG. 8 are executed. As shown, the flowchart of the illustrative operations 800 provide for the user go live features in the delivery of social networking meetup services in accordance with an embodiment. This is a user-activated feature (e.g., using a touchscreen display on the user device 300) that allows the user to see and be seen by other users who have similarly activated the go live feature (and only such user(s) that have so activated this go live feature). In an embodiment, users that are presented are each within a variable location proximity radius of the respective current real-time location of the particular one user activating the go live feature. The variable location proximity radius, in an embodiment, may be in a range of one (1) to (3) miles. In an embodiment, the user may shift and redefine that variable location proximity radius from their current location to a location within a maximum distance (e.g., sixty (60) miles). In accordance with the instant embodiment, the user is able to see other users who may be in another area that the user plans to visit in the near future. In this way, at step 802, receiving a go live activation request from a user and, at step 804, presenting the user's current location to other users who have similarly activated the go live feature (and only such other users). Presenting, at step 806, to the user any other RSVP users and other non-RSVP users that have also executed a go live activation with the variable location proximity radius, and at step 808, selecting in real-time at least one of the other RSVP users and other non-RSVP users for a potential meetup. In an embodiment, the user may also create and make public an event for posting (e.g., on the aforementioned events tab; see also steps 636 and 638 in FIG. 6B) that enables other users to RSVP, before the event, for that particular event (e.g., a concert) and connect with the user and/or other users who plan on physically being present that same day or at some future day/time. At step 810, establishing a real-time communications link between the user and the at least one of the other RSVP users and other non-RSVP users selected. Again, any such user selected will have necessarily been within the variable location proximity radius at the time of their selection. The user, at step 812, is provided an opportunity to shift and redefine the variable location proximity radius from their current location to a location within a maximum distance (e.g., sixty (60) miles). If so, at step 814, receiving the new location for moving the variable location proximity radius and the operations continue at step 806. If no shift is desired, then the operations end.

Figure 4:
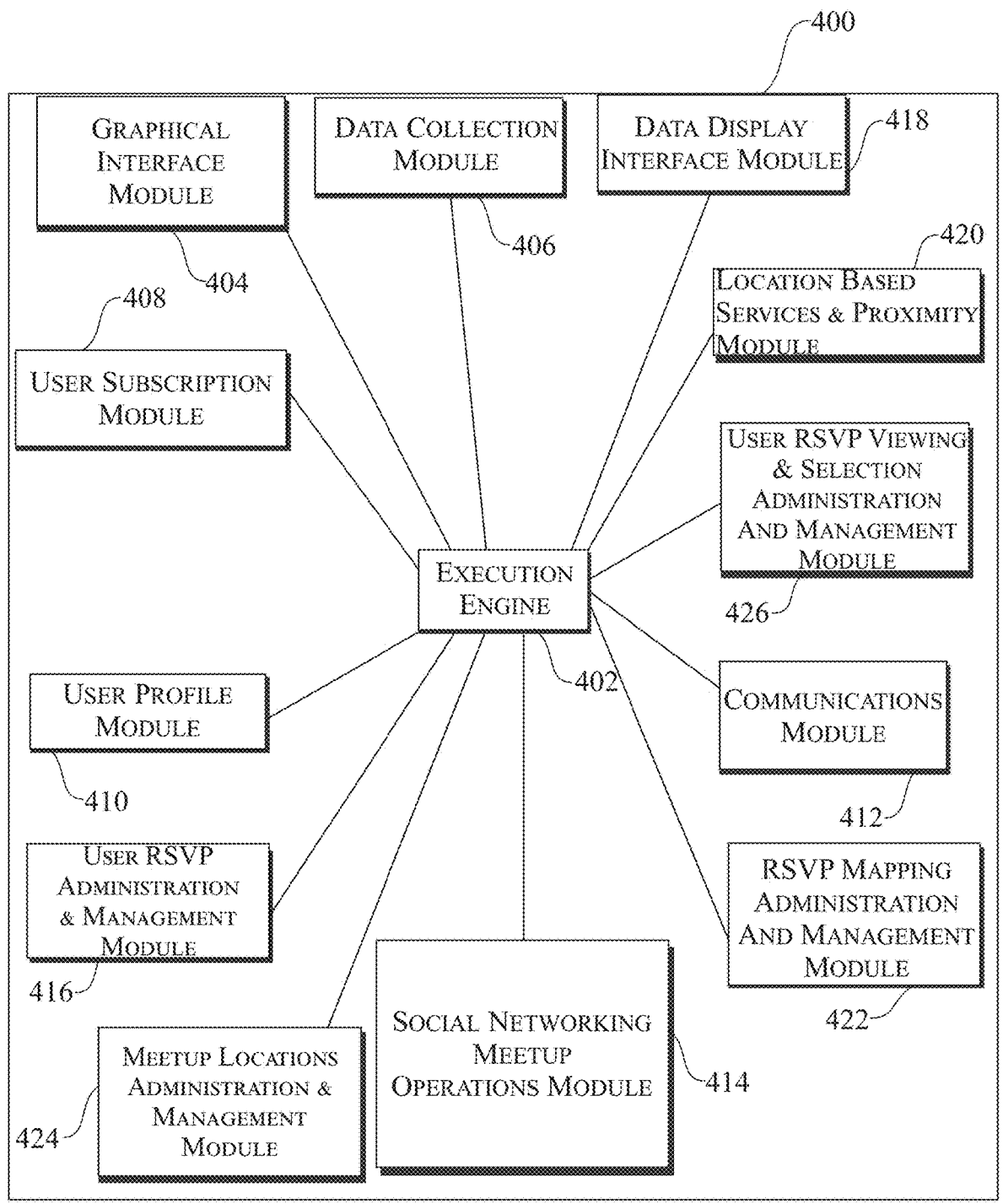
FIG. 4 presents an illustrative architecture for a social networking meetup app in accordance with an embodiment.

Turning our attention to FIG. 4, an illustrative architecture for the operation of the social networking meetup app 400 is presented in accordance with an embodiment. As will be appreciated, the architecture may be used, illustratively, in conjunction with the cloud network services architecture 100, the social networking meetup system 200, and/or the user device 300 for launching and executing the social networking meetup app 400 and its associated operations. As shown, the architecture for the operations of the social networking meetup app 400 provides several interfaces and engines used to perform a variety of functions such as the collection, aggregation, manipulation, processing, analyzing, verification, authentication, and display of applicable real-time information and data that are useful to realize the delivery of the social networking meetup operations of the disclosed embodiments. More particularly, data display interface module 418 and communications module 412 are used to facilitate the input/output and display of electronic data and other information to, illustratively, the users (e.g., subscriber user 1 110-1 through subscriber user N 110-N) employing the user device 300 (e.g., a touch screen of the user device 300) and executing the social networking meetup app 400. The data collection module 406 facilitates data gathering from the plurality of users and other third parties. The location-based services and proximity module 420 provides for the delivery of location-based services in order for the geographic locations of the users to be identified and displayed (e.g., GPS locations), as detailed above, in accordance with the various proximity-based features of the disclosed embodiments. The communications module 412 will also facilitate communications by and through the social networking meetup system 200, for example.

Execution engine 402 may be employed to deliver the social networking meetup services herein through the execution of the social networking meetup app 400. In such delivery, the execution engine 402 will operate and execute, as further detailed herein below, with at least the following program modules: graphical interface module 404, data collection module 406, user subscription module 408, user profile module 410, communications module 412, social networking meetup operations module 414, user RSVP administration and management module 416, RSVP mapping administration and management module 422, meetup locations (venue/event/POI/specific locations) administration and management module 424, and user RSVP viewing selection administration and management module 426. The user subscription module 408 provides for the delivery and management of a subscription-based social networking meetup services model whereby individual users (e.g., subscriber user 1 110-1 through subscriber user N 110-N) subscribe in order to access the social networking meetup services through execution of the social networking meetup app 400 and engaging in their social networking activities. In an embodiment, the user may initially subscribe, as facilitated by the user subscription module 408 for a defined fee in a tier subscription system such that users who pay more for their access subscription are provided priority and other advantages over other users in lower tiers or who are subscribed through a base "no fee" trial plan (e.g., a free 30 day trial period). Illustratively, a user paying the subscription fee will be able to RSVP at potential meetup locations on a priority basis or have the ability to store more personal information about their meetup criteria and personal preferences. The user subscription module 408 will also provide for the creation and maintenance of individual user profiles for each subscribed user in conjunction with the user profile module 410 that will manage and administer such user profiles. Further, in an embodiment, the graphical interface module 404, data display interface module 418, and the communications module 412 are used to facilitate the input/output and display of electronic data and other information (e.g., a graphical user interface) to, illustratively, the users (e.g., subscriber user 1 110-1 through subscriber user N 110-N) employing the user device 300 (e.g., a touch screen of a mobile device) and executing the social networking meetup app 400. The data collection interface 406 facilitates social networking meetup services information collection from the plurality of users (i.e., subscriber user 1 110-1 through subscriber user N 110-N) such as their RSVP indications for potential meetup locations, third party information providers (e.g., the third party content providers 114) and/or social media services (e.g., the social media services 120). The data collection 406 may also be used to collect a variety of social networking meetup services information (e.g., personal information, photographs, dating status, etc.) information from other virtual and/or electronic sources accessible via the Internet 122 and individual third party websites hosted thereon. The user RSVP administration and management module 416, RSVP mapping administration and management module 422, meetup locations (venue/event/POI/specific locations) administration and management module 424, and user RSVP viewing selection administration and management module 426 facilitate the various user RSVP indication operations in accordance with the disclosed embodiments. The operations executed by each and every of the foregoing modules are, for example, as discussed herein above with reference to FIGS. 5-8.

Those skilled in the art will appreciate that the present disclosure contemplates the use of systems configurations and/or computer instructions that may perform any or all of the operations involved in the social networking meetup services herein. The disclosure of computer instructions that include, for example, the social networking meetup app 400 and the social networking meetup system 200 instructions is not meant to be limiting in any way. Those skilled in the art will readily appreciate that stored computer instructions and/or systems configurations may be configured in any way while still accomplishing the various goals, features, and advantages according to the present disclosure. The terms "program," "application," "software application," and the like as used herein, are defined as a sequence of instructions designed for execution on a computer system. A "program," "computer program," "application," or "software application" may include a subroutine, a function, a procedure, an object method, an object implementation, an executable application, an applet, a servlet, a source code, an object code, a shared library/dynamic load library, and/or other sequence of instructions designed for execution on a computer system.

Figure 9:
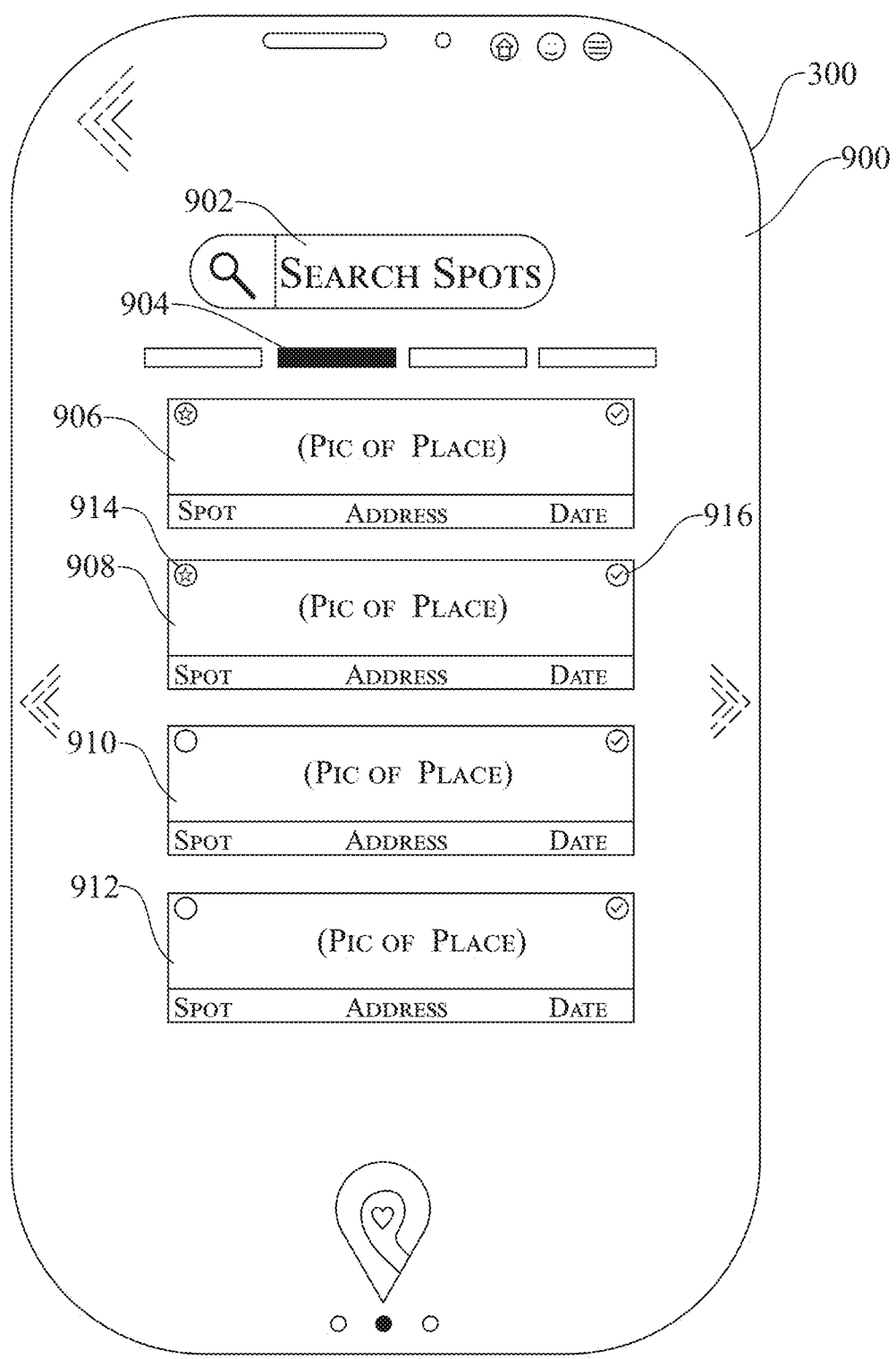
FIGS. 9, 10, 11, 12, 13, and 14 present a series of illustrative user device interfaces resulting from the social networking meetup services operations in accordance with an embodiment.
Figure 10:
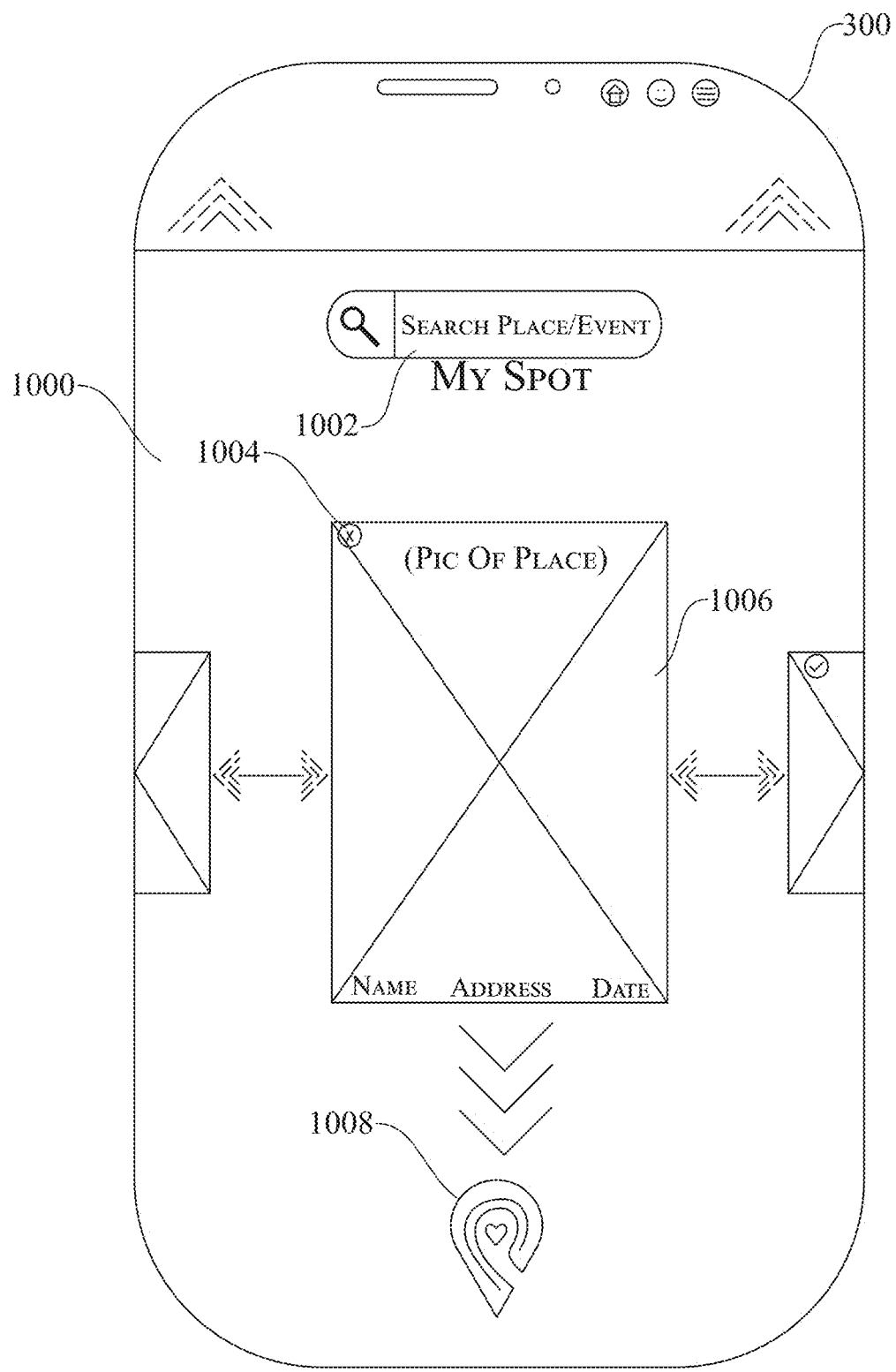

Turning our attention collectively to FIGS. 9, 10, 11, 12, 13, and 14 a series of illustrative user device interfaces are shown for providing the social networking meetup services and operations in accordance with an embodiment. Illustratively, as shown in FIG. 9, user interface 900 is a mobile user interface, as displayed by and through the user device 300, to the user (e.g., the subscriber user 1 110-1) comprising (i) a search meetup locations/spots 902 to search for one or more potential meetup locations; (ii) an options touch screen control 904 that allows the user to select and launch the various options available, for example, through the social networking meetup app 400; (iii) potential meetup location 906, potential meetup location 908, potential meetup location 910, and potential meetup location 912 as returned by either a user search or by the social networking meetup app 400 in showing, for example, a listing of most popular meetup locations organized by total number of RSVPs received; and (iv) a favorite touch screen control 914 allowing the user to designate the associated potential meetup location (e.g., the potential meetup location 908) and store that meetup location for future access, and a RSVP indication touch screen control 916 for the user to provide an RSVP indications for the associated potential meetup location. As shown in FIG. 10, user interface 1000 is a mobile user interface, as displayed by and through the user device 300, to the user (e.g., the subscriber user 1 110-1) where the user has searched through their favorites (i.e., "My Spots") for a particular place using touch screen control 1002 producing the pictorial place display 1006. Illustratively, the user may swipe left for a prior place or swipe right for "no" in attempting to match with another user who has "RSVP'd" the same meetup location. Touch screen control 1004 allows the user to remove the displayed place, for example, for their favorites if so desired, and tapping icon 1008 allows the user to enter a short comment about the pictorial place display 1006.

Figure 11:
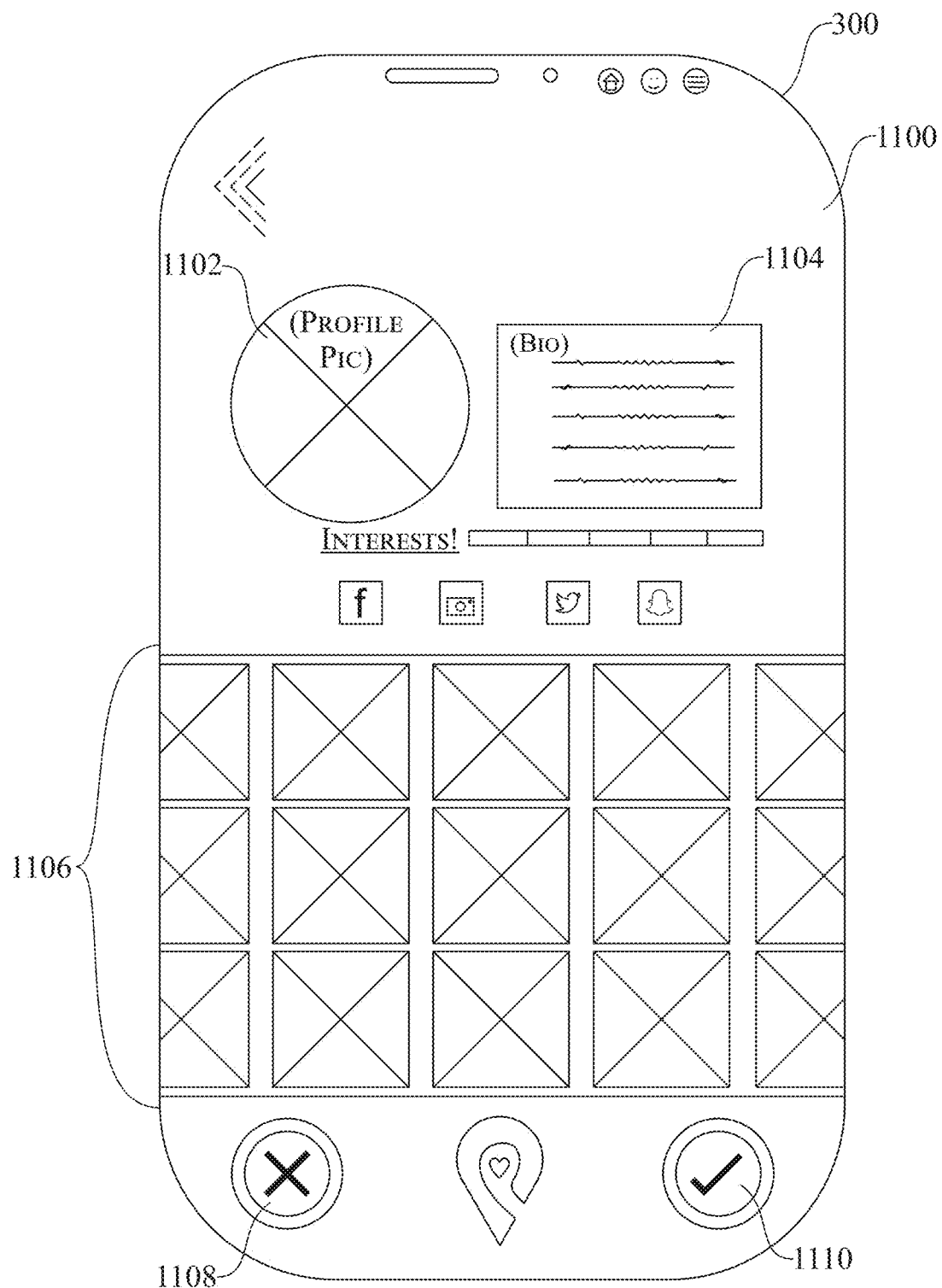
Figure 12:
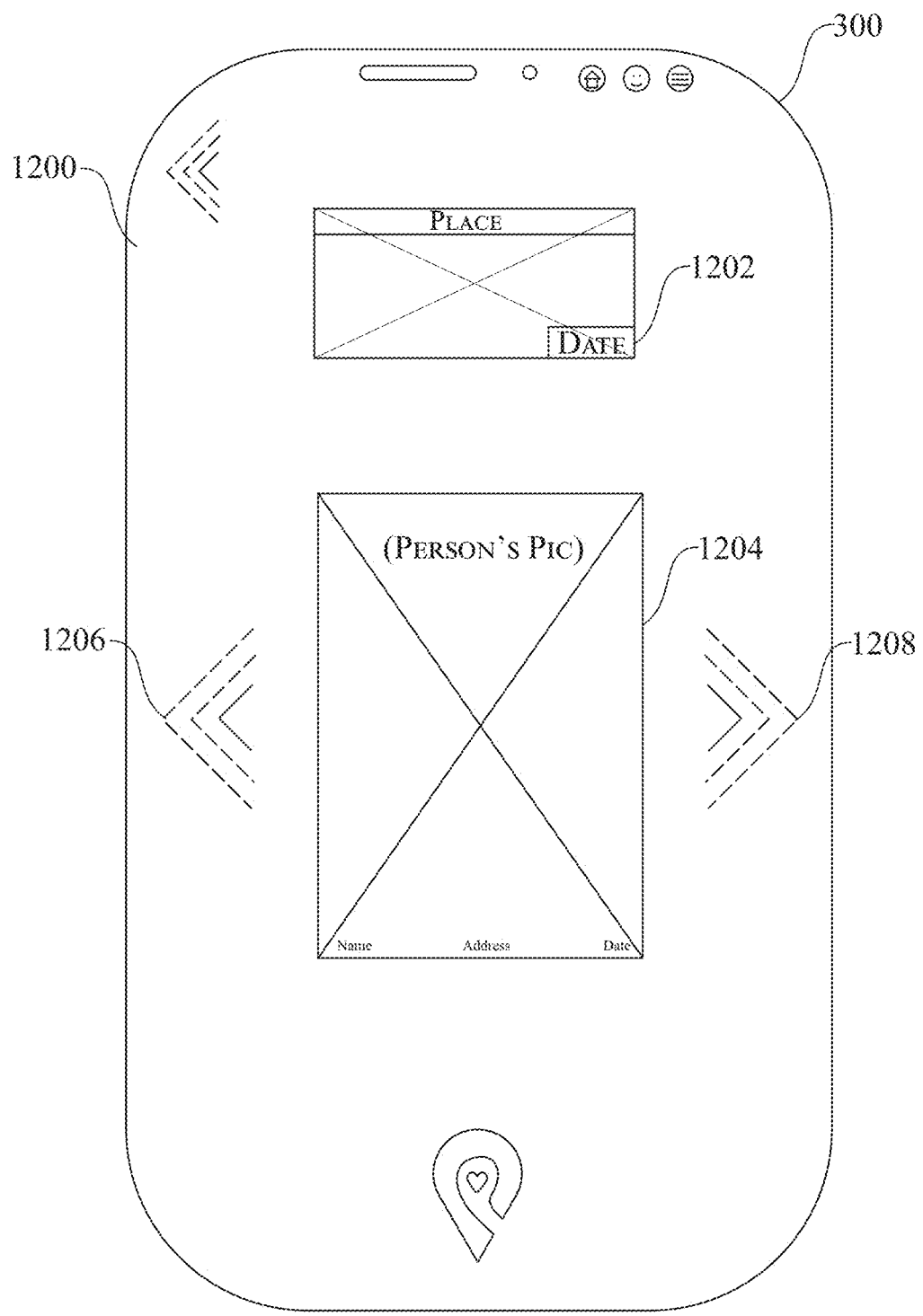

As detailed herein above, the social networking meetup services of the disclosed embodiments identify and provide to a user a plurality of potential other users that they may wish to meetup with in the future at some desired location based on indicated user RSVPs. Illustratively, as shown in FIG. 11, user interface 1100 is a mobile user interface, as displayed by and through the user device 300, to the user (e.g., the subscriber user 1 110-1) that is presenting the user profile 1102 and biographical information 1104 with respect to one such RSVP user as selected by the user using the touchscreen of the user device 300. For example, such selection is made from the plurality of other RSVP users 1106 that are also displayed through the user interface 1100 where a thumbnail photograph is displayed for each of the other RSVP users and for potential selection (i.e., "like") by the user using touch screen control 1110 or rejection (i.e., "dislike") using touchscreen control 1108. As detailed above, the user is able to select any number of the presented other RSVP users that have been matched (e.g., by the social networking meetup app 400 employing the associated user profile for filtering purposes). In this way, FIG. 12 shows an exemplary selection where user interface 1200 is a mobile user interface, as displayed by and through the user device 300, to the user (e.g., the subscriber user 1 110-1) that is presenting the selection of meetup location 1202 (i.e., the meetup location subject to the respective RSVP indication) together with the picture display 1204 of the particular other RSVP user associated therewith. Again, as shown, the user may employ the user device 300 to view the presented other users and swipe left 1206 for "yes" or swipe right 1208 for "no" in attempting to match with another user who has "RSVP'd" the same meetup location.

Figure 13:
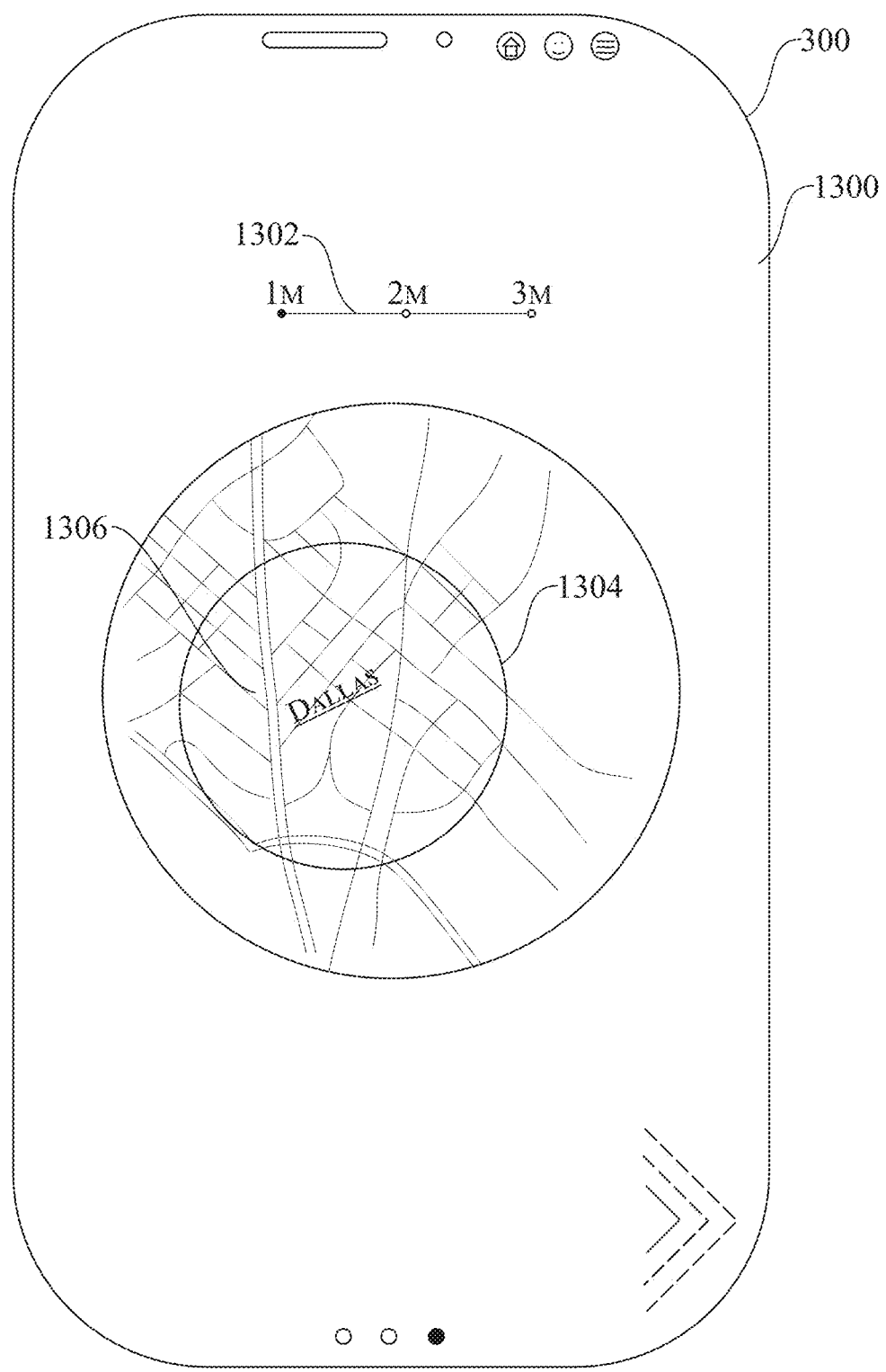
Figure 14:
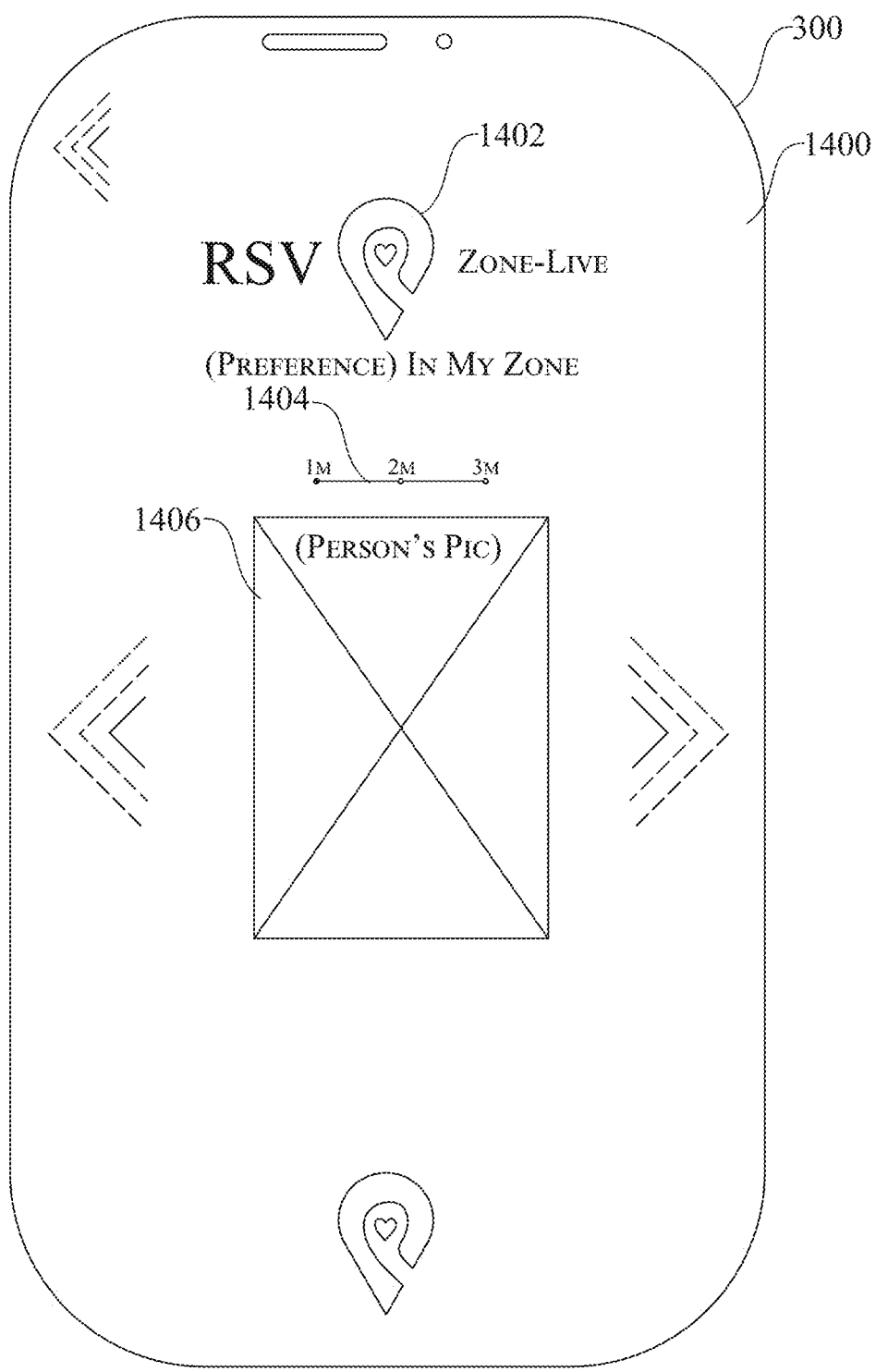

As detailed above, the social networking meetup service users may only engage and communicate with other users, on an initial basis, that have provided RSVP indications to the same potential meetup location. For example, in an embodiment, matching user RSVP indications is identified from the plurality of user RSVP indications of other users of the plurality of users that are within a variable location proximity radius with respect to the potential meetup locations selected. In this way, FIG. 13 shows an exemplary selection where user interface 1300 is a mobile user interface, as displayed by and through the user device 300, to the user (e.g., the subscriber user 1 110-1) that is presenting the applicable variable location proximity radius 1302 for a particular variable location proximity zone 1304. In an embodiment, the variable location proximity radius 1302 may be adjusted and redefined by a user at any time. In another aspect the variable location proximity radius 1302 is in a range of one (1) to three (3) miles. Of course, the setting for the variable location proximity radius may be a system setting and adjustable by the system (e.g., the social networking meetup system 200 and/or the social networking meetup application 400) in a further embodiment. In this way, the applicable variable location proximity radius 1302 and the variable location proximity zone 1304 define a specific geographic area 1306 about a particular RSVP location or the user's current location, for example, from which RSVP indications from other users will be selected and/or potential meetup location identified, as detailed herein above. Thus, FIG. 14 shows an exemplary selection where user interface 1400 is a mobile user interface, as displayed by and through the user device 300, to the user (e.g., the subscriber user 1 110-1) that is presenting for the meetup location subject to the respective RSVP indication (e.g., the selection of meetup location 1402) and variable location proximity radius 1404, the picture display 1406 of a particular other RSVP user associated therewith. Again, as shown, the user may employ the user device 300 to view the presented other users and swipe left for "yes" or swipe right for "no" in attempting to match with another user who has "RSVP'd" the same meetup location.

As noted above, in some embodiments the method or methods described above may be executed or carried out by a computing system including a non-transitory computer-readable storage medium, also described herein as a storage machine, that holds machine-readable instructions executable by a logic machine (i.e., a processor or programmable control device) to provide, implement, perform, and/or enact the above described methods, processes and/or tasks. When such methods and processes are implemented, the state of the storage machine may be changed to hold different data. For example, the storage machine may include memory devices such as various hard disk drives, CD, or DVD devices. The logic machine may execute machine-readable instructions via one or more physical information and/or logic processing devices. For example, the logic machine may be configured to execute instructions to perform tasks for a computer program. The logic machine may include one or more processors to execute the machine-readable instructions. The computing system may include a display subsystem to display a graphical user interface (GUI), or any visual element of the methods or processes described above. For example, the display subsystem, storage machine, and logic machine may be integrated such that the above method may be executed while visual elements of the disclosed system and/or method are displayed on a display screen for user consumption. The computing system may include an input subsystem that receives user input. The input subsystem may be configured to connect to and receive input from devices such as a mouse, keyboard, or gaming controller. For example, a user input may indicate a request that certain task is to be executed by the computing system, such as requesting the computing system to display any of the above-described information or requesting that the user input updates or modifies existing stored information for processing. A communication subsystem may allow the methods described above to be executed or provided over a computer network. For example, the communication subsystem may be configured to enable the computing system to communicate with a plurality of personal computing devices. The communication subsystem may include wired and/or wireless communication devices to facilitate networked communication. The described methods or processes may be executed, provided, or implemented for a user or one or more computing devices via a computer-program product such as via an application programming interface (API).

Thus, the steps of the disclosed method (see, e.g., FIGS. 5-8) and the associated discussion herein above can be defined by the computer program instructions stored in a memory and/or data storage device and controlled by a processor executing the computer program instructions. Accordingly, by executing the computer program instructions, the processor executes an algorithm defined by the disclosed method. For example, the computer program instructions can be implemented as computer executable code programmed by one skilled in the art to perform the illustrative operations defined by the disclosed methods. Further, it will be appreciated that any flowcharts, flow diagrams, state transition diagrams, pseudo code, program code and the like represent various processes which may be substantially represented in computer readable medium and so executed by a computer, machine, or processor, whether or not such computer, machine or processor is explicitly shown. One skilled in the art will recognize that an implementation of an actual computer or computer system may have other structures and may contain other components as well, and that a high level representation of some of the components of such a computer is for illustrative purposes.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A method comprising:
receiving a plurality of user RSVP indications, each user RSVP indication associated with a respective one user of a plurality of users and an associated meetup location designated by the respective one user for which the respective one user intends on being physically present at a future time;
presenting, on a user device associated with a particular one user of the plurality of users, a plurality of potential meetup locations;
receiving, from the user device associated with the particular one user, an indication that the particular one user is interested in at least one of the potential meetup locations presented;
responsive to the indication that the particular one user is interested in at least one of the potential meetup locations presented, receiving a selection, from the user device associated with the particular one user, of the at least one of the potential meetup locations presented of interest;
identifying a first set of matching user RSVP indications from the plurality of user RSVP indications of other users of the plurality of users that match with the at least one of the potential meetup locations selected;
filtering the first set of matching user RSVP indications from the plurality of user RSVP indications of other users of the plurality of users identified to provide a first subset of matching user RSVP indications;
presenting, on the user device associated with the particular one user, the first subset of matching user RSVP indications;
receiving, from the user device associated with the particular one user, one or more selections from the first subset of matching user RSVP indications presented;
matching, based on at least a first indication of mutual interest, at least one of the other users associated with the one or more selections from the first subset of matching user RSVP indications with the particular one user;
establishing a communications link between the particular one user and the at least one of the other users matched;
receiving, from the user device associated with the particular one user via a graphical user interface using a touchscreen that allows the particular one user to see and be seen by the other users by activating a go live designation, the go live designation indicating they wish to publish their respective current real-time location to the other users of the plurality of users;
receiving from the other users the go live designation indicating they wish to publish their respective current real-time location;
presenting the respective current real-time location of the particular one user to the other users of the plurality of users but only if the other users have also indicated the go live designation to publish their respective current real-time location and the other users are within a variable location proximity radius of the respective current real-time location of the particular one user; and
presenting the respective current real-time location of the other users to the particular one user that are within the variable location proximity radius of the respective current real-time location of the particular one user.

2. The method of claim 1, wherein the method further comprises:
identifying a second set of matching user RSVP indications from the plurality of user RSVP indications of other users of the plurality of users that are within the variable location proximity radius with respect to the at least one of the potential meetup locations selected.

3. The method of claim 2, wherein the method further comprises:
adjusting, by the particular one user, the variable location proximity radius, wherein the variable location proximity radius adjusted is in a range of one (1) to three (3) miles.

4. The method of claim 3, wherein the method further comprises:
filtering the second set of matching user RSVP indications from the plurality of user RSVP indications of other users of the plurality of users identified to provide a second subset of matching user RSVP indications;
presenting, on the user device associated with the particular one user, the second subset of matching user RSVP indications;
receiving, from the user device associated with the particular one user, one or more selections from the second subset of matching user RSVP indications presented;
matching, based on at least a second indication of mutual interest, at least one of the other users associated with the one or more selections from the second subset of matching user RSVP indications with the particular one user; and
establishing the communications link between the particular one user and the at least one of the other users matched from the second subset of matching user RSVP indications.

5. The method of claim 4, wherein the method further comprises:

identifying a third set of matching user RSVP indications from the plurality of user RSVP indications of other users of the plurality of users that match with the at least one of the potential meetup locations selected wherein the other users were previously present at the at least one of the potential meetup locations during a specified time interval but the communications link was never established with the particular one user.

6. The method of claim 5, wherein the method further comprises:
   filtering the third set of matching user RSVP indications identified to provide a third subset of matching user RSVP indications;
   presenting, on the user device associated with the particular one user, the third subset of matching user RSVP indications;
   receiving, from the user device associated with the particular one user, one or more selections from the third subset of matching user RSVP indications presented;
   matching, based on at least a third indication of mutual interest, at least one of the other users associated with the one or more selections from the third subset of matching user RSVP indications with the particular one user; and
   establishing the communications link between the particular one user and the at least one of the other users matched from the third subset of matching user RSVP indications.

7. The method of claim 5, wherein the specified time interval is a twenty-four (24) hour interval.

8. The method of claim 1, wherein the method further comprises:
   ordering the plurality of potential meetup locations based on a number of total user RSVP indications for each of the potential meetup locations, and wherein the presenting of the plurality of potential meetup locations is performed in accordance with the ordering of the plurality of potential meetup locations.

9. The method of claim 1, wherein the method further comprises:
   receiving a user profile specific to the particular one user, and wherein the filtering of the first set of matching user RSVP indications is executed in accordance with the user profile received.

10. The method of claim 1, wherein one of more of the user RSVP indications associated with the respective one user of the plurality of users designates an associated meetup location that the respective one user has an interest to be present at some future time and the plurality of potential meetup locations comprise one or more venues, places of interest, events, and user-specified geographic locations.

11. A method comprising:
    receiving a plurality of user RSVP indications, each user RSVP indication associated with a respective one user of a plurality of users and an associated meetup location designated by the respective one user for which the respective one user intends on being physically present at a future time;
    presenting, on a user device associated with a particular one user of the plurality of users, a plurality of potential meetup locations;
    receiving, from the user device associated with the particular one user, an indication that the particular one user is interested in at least one of the potential meetup locations presented;
    responsive to the indication that the particular one user is interested in at least one of the potential meetup locations presented, receiving a selection, from the user device associated with the particular one user, of the at least one of the potential meetup locations presented of interest;
    identifying a first set of matching user RSVP indications from the plurality of user RSVP indications of other users of the plurality of users that match with the at least one of the potential meetup locations selected;
    filtering the first set of matching user RSVP indications from the plurality of user RSVP indications of other users of the plurality of users identified to provide a first subset of matching user RSVP indications;
    presenting, on the user device associated with the particular one user, the first subset of matching user RSVP indications;
    receiving, from the user device associated with the particular one user, one or more selections from the first subset of matching user RSVP indications presented;
    matching, based on at least a first indication of mutual interest, at least one of the other users associated with the one or more selections from the first subset of matching user RSVP indications with the particular one user;
    receiving, from the user device associated with the particular one user via a graphical user interface using a touchscreen that allows the particular one user to see and be seen by the other users by activating a go live designation, the go live designation indicating they wish to publish their respective current real-time location to the other users of the plurality of users;
    receiving from the other users the go live designation indicating they wish to publish their respective current real-time location;
    presenting the respective current real-time location of the particular one user to the other users of the plurality of users but only if the other users have also indicated the go live designation to publish their respective current real-time location and the other users are within a variable location proximity radius of the respective current real-time location of the particular one user;
    presenting the respective current real-time location of the other users to the particular one user that are within the variable location proximity radius of the respective current real-time location of the particular one user;
    establishing a communications link between the particular one user and the at least one of the other users matched; and
    adjusting, by the particular one user, the variable location proximity radius, wherein the variable location proximity radius adjusted is in a range of one (1) to three (3) miles.

12. A method comprising:
    receiving a plurality of user RSVP indications, each user RSVP indication associated with a respective one user of a plurality of users and an associated meetup location designated by the respective one user for which the respective one user intends on being physically present at a future time;
    presenting, on a user device associated with a particular one user of the plurality of users, a plurality of potential meetup locations;
    receiving, from the user device associated with the particular one user, an indication that the particular one user is interested in at least one of the potential meetup locations presented;
    responsive to the indication that the particular one user is interested in at least one of the potential meetup locations presented, receiving a selection, from the user device associated with the particular one user, of the at least one of the potential meetup locations presented of interest;

identifying a first set of matching user RSVP indications from the plurality of user RSVP indications of other users of the plurality of users that match with the at least one of the potential meetup locations selected;

adjusting, by the particular one user, a variable location proximity radius, wherein the variable location proximity radius adjusted is in a range of one (1) to three (3) miles;

identifying a second set of matching user RSVP indications from the plurality of user RSVP indications of other users of the plurality of users that are within the variable location proximity radius adjusted with respect to the at least one of the potential meetup locations selected;

filtering the first set of matching user RSVP indications and the second set of matching user RSPV indications from the plurality of user RSVP indications of other users of the plurality of users identified to provide a first subset of matching user RSVP indications and a second subset of matching user RSVP indications, respectively;

presenting, on the user device associated with the particular one user, the first subset of matching user RSVP indications and the second subset of matching user RSVP indications;

receiving, from the user device associated with the particular one user, one or more selections from either of the first subset of matching user RSVP indications and the second subset of matching user RSVP indications presented;

matching, based on at least an indication of mutual interest, at least one of the other users associated with the one or more selections from either of the first subset of matching user RSVP indications and the second subset of matching user RSVP indications with the particular one user;

receiving, from the user device associated with the particular one user via a graphical user interface using a touchscreen that allows the particular one user to see and be seen by the other users by activating a go live designation, the go live designation indicating they wish to publish their respective current real-time location to the other users of the plurality of users;

receiving from the other users the go live designation indicating they wish to publish their respective current real-time location;

presenting the respective current real-time location of the particular one user to the other users of the plurality of users but only if the other users have also indicated the go live designation to publish their respective current real-time location and the other users are within a variable location proximity radius of the respective current real-time location of the particular one user;

presenting the respective current real-time location of the other users to the particular one user that are within the variable location proximity radius of the respective current real-time location of the particular one user; and establishing a communications link between the particular one user and the at least one of the other users matched.

13. The method of claim 12, the method further comprises:

receiving a user profile specific to the particular one user, and wherein the filtering of the first set of matching user RSVP indications is executed in accordance with the user profile received.

14. The method of claim 12, wherein the method further comprises:

identifying a third set of matching user RSVP indications from the plurality of user RSVP indications of other users of the plurality of users that match with the at least one of the potential meetup locations selected wherein the other users were previously present at the at least one of the potential meetup locations during a specified time interval but the communications link was never established with the particular one user.

15. The method of claim 12, wherein one of more of the user RSVP indications associated with the respective one user of the plurality of users further designates an associated meetup location that the respective one user has an interest to be present at some future time and the plurality of potential meetup locations comprise one or more venues, places of interest, events, and user-specified geographic locations.

16. A method comprising:

receiving a plurality of user RSVP indications, each user RSVP indication associated with a respective one user of a plurality of users and an associated meetup location designated by the respective one user for which the respective one user intends on being physically present at a future time, wherein the plurality of potential meetup locations comprise one or more venues, places of interest, events, and user-specified geographic locations;

presenting, on a user device associated with a particular one user of the plurality of users, a plurality of potential meetup locations;

receiving, from the user device associated with the particular one user, an indication that the particular one user is interested in at least one of the potential meetup locations presented;

responsive to the indication that the particular one user is interested in at least one of the potential meetup locations presented, receiving a selection, from the user device associated with the particular one user, of the at least one of the potential meetup locations presented of interest;

identifying a first set of matching user RSVP indications from the plurality of user RSVP indications of other users of the plurality of users that match with the at least one of the potential meetup locations selected;

adjusting, by the particular one user, a variable location proximity radius, wherein the variable location proximity radius adjusted is in a range of one (1) to three (3) miles;

identifying a second set of matching user RSVP indications from the plurality of user RSVP indications of other users of the plurality of users that are within the variable location proximity radius adjusted with respect to the at least one of the potential meetup locations selected;

identifying a third set of matching user RSVP indications from the plurality of user RSVP indications of other users of the plurality of users that match with the at least one of the potential meetup locations selected wherein the other users were previously present at the at least one of the potential meetup locations during a specified time interval but a communications link was never established with the particular one user;

filtering the first set of matching user RSVP indications, the second set of matching user RSPV indications and the third set of matching user RSVP indications from the plurality of user RSVP indications of other users of the plurality of users identified to provide a first subset of matching user RSVP indications, a second subset of matching user RSVP indications, and a third subset of matching user RSVP indications, respectively;

presenting, on the user device associated with the particular one user, the first subset of matching user RSVP indications, the second subset of matching user RSVP indications, and the third subset of matching user RSVP indications;

receiving, from the user device associated with the particular one user, one or more selections from either of the first subset of matching user RSVP indications, the second subset of matching user RSVP indications, and the third subset of matching user RSVP indication presented;

matching, based on at least an indication of mutual interest, at least one of the other users associated with the one or more selections from either of the first subset of matching user RSVP indications, the second subset of matching user RSVP indications, and the third subset of matching user RSVP indications with the particular one user;

receiving, from the user device associated with the particular one user via a graphical user interface using a touchscreen that allows the particular one user to see and be seen by the other users by activating a go live designation, the go live designation indicating they wish to publish their respective current real-time location to the other users of the plurality of users;

receiving from the other users the go live designation indicating they wish to publish their respective current real-time location;

presenting the respective current real-time location of the particular one user to the other users of the plurality of users but only if the other users have also indicated the go live designation to publish their respective current real-time location and the other users are within the variable location proximity radius adjusted of the respective current real-time location of the particular one user;

presenting the respective current real-time location of the other users to the particular one user that are within the variable location proximity radius of the respective current real-time location of the particular one user; and establishing a communications link between the particular one user and the at least one of the other users matched.

17. The method of claim 16, wherein the method further comprises:

receiving a user profile specific to the particular one user, and wherein the filtering of the first set of matching user RSVP indications, the second set of matching user RSPV indications and the third set of matching user RSVP indications is executed in accordance with the user profile received.

* * * * *